US009317963B2

(12) United States Patent
Ruble et al.

(10) Patent No.: US 9,317,963 B2
(45) Date of Patent: Apr. 19, 2016

(54) GENERATING SCENES AND TOURS IN A SPREADSHEET APPLICATION

(71) Applicant: Microsoft Technology Licensing, LLC, Redmond, WA (US)

(72) Inventors: B. Scott Ruble, Bellevue, WA (US); Ehab Sobhy, Redmond, WA (US); Igor Borisov Peev, Arlington, WA (US); Curtis G. Wong, Medina, WA (US); John Alfred Payne, Seattle, WA (US); Jonathan Edgar Fay, Woodinville, WA (US); Kevin Fan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 429 days.

(21) Appl. No.: 13/898,469

(22) Filed: May 21, 2013

(65) Prior Publication Data

US 2014/0047328 A1 Feb. 13, 2014

Related U.S. Application Data

(60) Provisional application No. 61/681,851, filed on Aug. 10, 2012.

(51) Int. Cl.
*G06F 17/24* (2006.01)
*G06T 15/10* (2011.01)
(Continued)

(52) U.S. Cl.
CPC . *G06T 15/10* (2013.01); *G06F 3/01* (2013.01); *G06F 3/048* (2013.01); *G06F 3/0488* (2013.01); *G06F 3/04815* (2013.01); *G06F 3/04842* (2013.01); *G06F 17/24* (2013.01); *G06F 17/241* (2013.01); *G06F 17/246* (2013.01); *G06F 17/30056* (2013.01); *G06F 17/30061* (2013.01);
(Continued)

(58) Field of Classification Search
None
See application file for complete search history.

(56) References Cited

U.S. PATENT DOCUMENTS

| 5,526,478 | A | 6/1996 | Russell, Jr. et al. |
| 5,977,978 | A | 11/1999 | Carey et al. |

(Continued)

FOREIGN PATENT DOCUMENTS

| EP | 1736903 | 12/2006 |
| EP | 1840515 | 10/2007 |
| WO | WO 2010/087782 A2 | 8/2010 |

OTHER PUBLICATIONS

U.S. Official Action dated Jun. 6, 2014 in U.S. Appl. No. 13/711,629.
(Continued)

*Primary Examiner* — Kyle Stork
*Assistant Examiner* — Asher Kells
(74) *Attorney, Agent, or Firm* — Damon Rieth; Tom Wong; Micky Minhas

(57) ABSTRACT

Concepts and technologies are described herein for generating scenes and tours in a spreadsheet application. In accordance with the concepts and technologies disclosed herein, a computer system executes a visualization component. Selection of an option to create a tour can be detected by the computer system. In response to detecting selection of the option, the computer system can create a tour. The computer system also can detect selection of an option to add a scene to the tour. The tour can be saved. Playback of the tour can be started in response to detecting selection of a play option. If the playback is paused, changes made to the tour and/or the scenes can be tracked by the computer system, and an updated version of the tour can be saved.

20 Claims, 17 Drawing Sheets

(51) Int. Cl.
*G06T 13/00* (2011.01)
*G06F 17/30* (2006.01)
*G06F 3/0481* (2013.01)
*G06F 3/01* (2006.01)
*G06T 11/20* (2006.01)
*G06F 3/0488* (2013.01)
*G06F 3/0484* (2013.01)
*G06T 19/00* (2011.01)
*G06F 3/048* (2013.01)
*G06T 15/00* (2011.01)

(52) U.S. Cl.
CPC ...... *G06F 17/3087* (2013.01); *G06F 17/30241* (2013.01); *G06F 17/30244* (2013.01); *G06F 17/30551* (2013.01); *G06F 17/30554* (2013.01); *G06F 17/30572* (2013.01); *G06F 17/30991* (2013.01); *G06T 11/206* (2013.01); *G06T 13/00* (2013.01); *G06T 15/00* (2013.01); *G06T 19/00* (2013.01)

(56) References Cited

U.S. PATENT DOCUMENTS

| | | |
|---|---|---|
| 6,256,649 B1 | 7/2001 | Mackinlay et al. |
| 6,501,469 B1 | 12/2002 | Macphail |
| 6,707,454 B1 * | 3/2004 | Barg .................. G06F 17/246 345/440 |
| 6,904,392 B1 | 6/2005 | Marty et al. |
| 6,990,637 B2 | 1/2006 | Anthony et al. |
| 6,995,768 B2 | 2/2006 | Jou et al. |
| 7,057,612 B2 | 6/2006 | Balfour |
| 7,127,672 B1 | 10/2006 | Patterson et al. |
| 7,264,554 B2 | 9/2007 | Bentley |
| 7,289,227 B2 | 10/2007 | Smetak et al. |
| 7,333,113 B2 | 2/2008 | Gordon |
| 7,358,972 B2 | 4/2008 | Gordon et al. |
| 7,370,883 B2 | 5/2008 | Basir et al. |
| 7,474,256 B2 | 1/2009 | Ohta et al. |
| 7,573,480 B2 | 8/2009 | Gordon |
| 7,688,998 B2 | 3/2010 | Tuma et al. |
| 7,696,876 B2 | 4/2010 | Dimmer et al. |
| 7,737,979 B2 | 6/2010 | Robertson et al. |
| 7,746,343 B1 | 6/2010 | Charaniya et al. |
| 7,810,021 B2 | 10/2010 | Paxson |
| 7,812,842 B2 | 10/2010 | Gordon |
| 7,840,031 B2 | 11/2010 | Albertson et al. |
| 7,857,212 B1 | 12/2010 | Matthews |
| 7,869,938 B2 | 1/2011 | Wako |
| 7,870,496 B1 | 1/2011 | Sherwani |
| 7,925,982 B2 | 4/2011 | Parker et al. |
| 8,015,183 B2 | 9/2011 | Frank |
| 8,024,656 B2 | 9/2011 | Behnen et al. |
| 8,095,434 B1 | 1/2012 | Puttick et al. |
| 8,319,772 B2 | 11/2012 | Fong et al. |
| 8,368,722 B1 | 2/2013 | Moore |
| 8,397,177 B2 | 3/2013 | Barros |
| 8,584,013 B1 | 11/2013 | Tveit |
| 8,601,402 B1 | 12/2013 | Habboub |
| 8,884,964 B2 | 11/2014 | Holl et al. |
| 8,892,123 B2 | 11/2014 | Krantz et al. |
| 8,924,843 B1 | 12/2014 | Hao et al. |
| 8,966,356 B1 | 2/2015 | Hickman et al. |
| 8,984,415 B2 | 3/2015 | Rose et al. |
| 9,007,302 B1 | 4/2015 | Bandt-Horn |
| 9,015,591 B2 | 4/2015 | Khosravy et al. |
| 9,141,641 B2 | 9/2015 | Gaertner et al. |
| 2003/0028848 A1 | 2/2003 | Choi |
| 2003/0071814 A1 * | 4/2003 | Jou .................. G06F 9/542 345/440 |
| 2006/0013487 A1 | 1/2006 | Longe et al. |
| 2006/0112123 A1 | 5/2006 | Clark et al. |
| 2007/0132767 A1 * | 6/2007 | Wright .............. G06K 9/00771 345/475 |
| 2007/0245238 A1 * | 10/2007 | Fugitt .................. G06F 3/0481 715/700 |
| 2008/0033641 A1 | 2/2008 | Medalia |
| 2008/0077597 A1 | 3/2008 | Butler |
| 2008/0163328 A1 | 7/2008 | Philbin et al. |
| 2008/0215959 A1 | 9/2008 | Lection |
| 2008/0270366 A1 | 10/2008 | Frank |
| 2008/0288889 A1 | 11/2008 | Hunt et al. |
| 2008/0291206 A1 | 11/2008 | Uchimura et al. |
| 2008/0294662 A1 | 11/2008 | Chen |
| 2008/0295038 A1 | 11/2008 | Helfman et al. |
| 2008/0301112 A1 | 12/2008 | Wu |
| 2009/0128565 A1 | 5/2009 | Wong et al. |
| 2009/0132952 A1 | 5/2009 | Wong |
| 2009/0132967 A1 | 5/2009 | Wong et al. |
| 2009/0153585 A1 | 6/2009 | Mahajan et al. |
| 2009/0217187 A1 | 8/2009 | Kendall et al. |
| 2009/0229819 A1 | 9/2009 | Repin et al. |
| 2009/0234864 A1 | 9/2009 | ExIlis et al. |
| 2009/0307607 A1 | 12/2009 | Schauls et al. |
| 2009/0307618 A1 | 12/2009 | Kawler et al. |
| 2010/0054527 A1 | 3/2010 | Kirmse et al. |
| 2010/0088619 A1 * | 4/2010 | Rath .................. G06F 8/38 715/764 |
| 2010/0117622 A1 | 5/2010 | Miller et al. |
| 2010/0134484 A1 | 6/2010 | Chen et al. |
| 2010/0156889 A1 | 6/2010 | Martinez et al. |
| 2010/0185933 A1 | 7/2010 | Coffman et al. |
| 2010/0185984 A1 | 7/2010 | Wright et al. |
| 2010/0194778 A1 | 8/2010 | Robertson et al. |
| 2010/0238182 A1 | 9/2010 | Geisner et al. |
| 2010/0271391 A1 | 10/2010 | Repin et al. |
| 2010/0318512 A1 | 12/2010 | Ludwig |
| 2010/0325196 A1 * | 12/2010 | Beckman .......... G06F 17/30516 709/203 |
| 2011/0066933 A1 | 3/2011 | Ludwig |
| 2011/0102424 A1 | 5/2011 | Hibbert et al. |
| 2011/0137766 A1 | 6/2011 | Rasmussen et al. |
| 2011/0140928 A1 | 6/2011 | Ren et al. |
| 2011/0166831 A1 | 7/2011 | Snyder et al. |
| 2011/0173193 A1 | 7/2011 | Ahn et al. |
| 2011/0210983 A1 | 9/2011 | Theimer et al. |
| 2011/0270705 A1 | 11/2011 | Parker |
| 2011/0285727 A1 | 11/2011 | Fernandez et al. |
| 2012/0042282 A1 | 2/2012 | Wong |
| 2012/0084733 A1 | 4/2012 | Guo et al. |
| 2012/0110513 A1 | 5/2012 | Gaertner et al. |
| 2012/0117112 A1 | 5/2012 | Johnston et al. |
| 2012/0144325 A1 | 6/2012 | Mital et al. |
| 2012/0173501 A1 | 7/2012 | Ganesan et al. |
| 2012/0173985 A1 | 7/2012 | Peppel |
| 2012/0218254 A1 | 8/2012 | Abeln |
| 2012/0236201 A1 * | 9/2012 | Larsen .................. H04N 21/235 348/468 |
| 2012/0284670 A1 | 11/2012 | Kashik et al. |
| 2013/0179817 A1 * | 7/2013 | Bak .................. H04L 43/0882 715/771 |
| 2014/0006966 A1 | 1/2014 | Geralci |
| 2014/0007017 A1 * | 1/2014 | Sternfeld .......... G06F 17/30241 715/848 |
| 2014/0026088 A1 * | 1/2014 | Monte .............. G01C 21/3682 715/765 |
| 2014/0028674 A1 | 1/2014 | Eldin |
| 2014/0043325 A1 | 2/2014 | Ruble et al. |
| 2014/0043340 A1 | 2/2014 | Sobhy et al. |
| 2014/0046923 A1 | 2/2014 | Ruble et al. |
| 2014/0047312 A1 | 2/2014 | Ruble et al. |
| 2014/0047313 A1 | 2/2014 | Patterson et al. |
| 2014/0047381 A1 | 2/2014 | Fan et al. |
| 2014/0047385 A1 | 2/2014 | Ruble et al. |
| 2014/0380244 A1 | 12/2014 | Tecarro et al. |
| 2015/0169694 A1 | 6/2015 | Longo et al. |
| 2015/0172396 A1 | 6/2015 | Longo et al. |

OTHER PUBLICATIONS

Darbyshire et al., "Getting Started With Google Apps", Friends of ED, Berkeley CA, 2010, 665 pages.

(56) References Cited

OTHER PUBLICATIONS

Office action for U.S. Appl. No. 13/835,721, mailed on Feb. 26, 2015, Sobhy, et al, "Animation transitions and effects in a spreadsheet application", 37 pages.
Office action for U.S. Appl. No. 13/711,629, mailed on Feb. 27, 2015, Ruble et al., "Generating Queries Based upon dated points in a spreadsheet application", 43 pages.
Pidgorny, Slawa, "3D Graphics Animations in Excel," Published on: Feb. 23, 2011, Spidgomy, available at: http://spidgomy.blogspot.com/2011/02/3d-graphics-animations-in-excel.html, 3 pages.
Office action for U.S. Appl. No. 13/835,721, mailed on Jun. 29, 2015, "Animation transitions and effects in a spreadsheet application", 45 pages.
Office action for U.S. Appl. No. 13/765,695, mailed on Apr. 24, 2015, Patterson et al., "Three-dimensional annotation facing", 12 pages.
Office action for U.S. Appl. No. 13/760,032, mailed on Apr. 24, 2015, Ruble et al., "3D Data environment disambiguation tool", 27 pages.
Office action for U.S. Appl. No. 13/856,116, mailed on May 21, 2015, Ruble et al., "Displaying Temporal Information in a Spreadsheet Application", 10 pages.
Office action for U.S. Appl. No. 13/906,343, mailed on May 26, 2015, Ruble et al., "Facetted Browsing", 14 pages.
Javaid, Usman., "Embed Video in Excel 2010", Retrieved at <<http://www.addictivetips.com/microsoft-office/embed-video-in-excel-2010/, Mar. 6, 2010, pp. 6.
"Welcome to the WorldWide Telescope Add-in for Excel," retrieved Dec. 13, 2012 from http://www.layerscape.org/Home/ExcelAddInWelcome, 2 pp.
Wong, Curtis, "Building the WorldWide Telescope," Jun. 2008, Sigmond Record, 37(2): 67-69.
Wong, Curtis, "Contextual Narrative as an Information Architecture for the WorldWide Telescope," May 2008, CAPjournal, 3: 22-25.
Kanipe, Jeff "The Universe in Your Computer," Jan. 2009, Communication of the ACM, 51(1): 12-14.
International Search Report dated Nov. 28, 2013 in International Application No. PCT/US13/054038.
International Search Report dated Oct. 24, 2013 in International Application No. PCT/US13/054039.
International Search Report dated Nov. 28, 2013 in International Application No. PCT/US13/054235.
International Search Report dated Oct. 14, 2013 in International Application No. PCT/US13/054236.
International Search Report dated Oct. 24, 2013 in International Application No. PCT/US13/054237.
International Search Report dated Nov. 7, 2013 in International Application No. PCT/US13/054238.
International Search Report dated Oct. 15, 2013 in International Application No. PCT/US13/054234.
International Search Report dated Oct. 18, 2013 in International Application No. PCT/US13/054239.
Aliakseyeu et al., "Interaction Techniques for Navigation through and Manipulation of 2D and 3D Data," Published on: May 30, 2002, In *Eigth Eurographics Workshop on Virtual Environments*, 10pp.
Allegra, Christo, "3D Data Visualization / Casey Reas", Winter 2009, Available at: http://plastid.com/files/3Dvisualization.pdf, 6pp.
Aigner et al., "Visual Methods for Analyzing Time-Oriented Data," Jan./Feb. 2008, *IEEE Transactions on Visualization and Computer Graphics*, 14(1): ,47-60.
Andy, "Google Earth—From the 3D City to Data Visualisation", Published on: Oct. 7, 2007, Available at: http://www.digitalurban.org/2007/10/google-earth-from-3d-city-to-data.html, 3pp.
Ben-Yitzhak et al., "Beyond Basic Faceted Search," Feb. 11, 2008, *Proceedings of the international conference on web search and web data mining '08*, 11 pp.
Chi, Ed Huai-Hsin, "A Framework for Information Visualization Spreadsheets", Published on: Mar. 8, 1999, Doctoral Thesis submitted to the faculty of the graduate school of the University of Minnesota, Available at: http://citeseerx.ist.psu.edu/viewdoc/download?doi=10.1.1.25.5975&rep=rep1&type=pdf, 160pp.
Chi et al., "Principles for Information Visualization Spreadsheets," Published on: Jul. 1998, In *IEEE Computer Graphics and Applications*, 9pp.
Chung et al., "VizCept: Supporting Synchronous Collaboration for Constructing Visualizations in Intelligence Analysis," Oct. 24-29, 2010, IEEE Symposium on Visual Analytics Science and Technology, Salt Lake City, Utah, 8 pp.
Clarke, Keir, "Viewing Large Data Sets with Google Maps," Sep. 9, 2010, Available at: webarchive.org/web/20111017065022/http://googlemapsmania.blogspot.com/2010/09/viewing-large-data-sets-with-google.html, 4 pp.
Clarkson et al., "ResultMaps: Visualization for Search Interfaces", Oct. 11, 2009, *IEEE Transactions on Visualization and Computer, Graphics*, vol. 15, No. 6, 8pp.
Enkhsaikhan et al., "Graphical and Temporal Visualisation of Social Relationships," Jul. 3, 2008, *Proceeding of Pacific Asia Conference on Information Systems*, PACIS '08, Paper 243, 12 pp.
Heer et al., "Animated Transitions in Statistical Data Graphics," Oct. 27, 2007, *IEEE Transactions on Visualization and Computer Graphics*, 13(6):1240-1247.
Jankun-Kelly et al., "A Spreadsheet Interface for Visualization Exploration," Published on: Oct. 13, 2000, In *IEEE Visualization*, 9pp.
Lutz et al., "Chartflight—From Spreadsheets to Computer-Animated Data Flights," 2010, *Proceedings of the 15th International Conference on Web 3D Technology*, pp. 127-136.
McDermott, Mat, "Great New Google Earth Layer Maps US Carbon Emission," Published on: Feb. 20, 2009, Available at: http://web.archive.org/web/20120206220208/http://www.treehugger.com/clean-technology/great-new-google-earth-layer-maps-us-carbon-emissions.html, 3 pp.
Pilgrim et al., "Abstract Data Visualisation in the Built Environment", Published on: Jul. 19, 2000, In *IEEE International Conference on Information Visualization*, 9pp.
Rayson, "Aggregate Towers: Scale Sensitive Visualization and Decluttering of Geospatial Data," Published on: Oct. 24, 1999, in *Information Visualization*, 9pp.
Roth et al., "Visage: A User Interface Environment for Exploring Information," Oct. 18, 1996, *IEEE Symposium on Information Visualization*, 8 pp.
Shiozawa et al., "3D Interactive Visualization for Inter-Cell Dependencies of Spreadsheets", Oct. 24, 1999, *IEEE Symposium on Information Visualization*, 4 pp.
Svennerberg, Gabriel, "Handling Large Amounts of Markers in Google Maps," Published on: Jan. 13, 2009, Available at: http://www.svennerberg.com/2009/01/handling-large-amounts-of-markers-in-google-maps/, 7pp.
Webb, Chris, "Self-Service BI Mapping with Microsoft Research's Layerscape—Part1," Published on: Apr. 13, 2012, Available at: http://cwebbi.wordpress.com/2012/04/13/self-servicde-bi-mapping-with-microsoft-researchs-layerscapepart-1/, 13 pp.
Woodring et al., "Multiscale Time Activity Data Exploration via Temporal Clustering Visualization Spreadsheet," Jan./Feb. 2009, *IEEE Transactions on Visualization and Computer Graphics*, 15(1): 123-137.
Woodward, "Mappable 3D Data Visualizations in Real-Time", Published on: Jan. 23, 2012, Available at: http://www.visualnews.com/2012/01123/mappable-3d-data-visualizations-in-real-time/, 15 pp.
Zhang et al., "Beyond Co-occurrence: Discovering and Visualizing Tag Relationships from Geo-spatial and Temporal Similarities," Feb. 8-12, 2012, *Proceedings of the fifth ACM international conference on Web search and data mining*, WSDM '12, Seattle, Washington, 10 pp.
"3D Graphics Animations in Excel," Feb. 23, 2011, Spidgorny, YouTube Video, Available at: http://www.youtube.com/watch?feature=player_embedded&v=7ucoeXEnkHO, 1 p.
"Displaying annotation features in ArcGlobe", Published on: Dec. 7, 2012, Available at: http://resources.arcgis.com/en/help/main/10.11index.html#//00q800000022000000, 2pp.
"Effective Information Visualization Guidelines and Metrics for 3D Interactive Representations of Business Data",Published on Dec. 7, 2012, Available at: http://www3.sympatico.ca/blevis/thesis49guide.html, 41 pp.

(56) References Cited

OTHER PUBLICATIONS

"Improving Data Visualisation for the Public Sector: Case Study: Practical Steps for Improving Visualisation," Oct. 2, 2009, retrieved from http://www.improving-visualisation.org/case-studies/id=7, 11 pp.

"Visualize Field Data in Google Earth and Fusion Tables," Published on: Apr. 29, 2012, Available at: http://web.archive.org/web/20120429055706/http://www.google.com/earth/outreach/tutorials/odk_visualize.html, 4pp.

U.S. Official Action dated Dec. 16, 2014 in U.S. Appl. No. 13/856,476.

U.S. Official Action dated Nov. 6, 2014 in U.S. Appl. No. 13/760,032.

"Create a Map / BatchGeo" Published 2010, Available at http://www/batchgeo.com, 7pp.

BatchGeo, "Create Maps", Retrieved from <<https://web.archive.org/web.20110305134009/http://www.batchgeo.com/>>, Mar. 2011, 9 pages.

BatchGeo, "How to edit your map", Retreived from <<https://www.youtube.com/watch?v=jaeR8VsEPJo>>, Mar. 30, 2010, 1 page.

Office action for U.S. Appl. No. 13/765,695, mailed on Oct. 29, 2015, Patterson et al., "Three-dimensional annotation facing", 18 pages.

Office action for U.S. Appl. No. 13/835,721, mailed on Oct. 30, 2015, Sobhy et al., "Animation Transitions and Effects in a Spreadsheet Application", 51 pages.

Office action for U.S. Appl. No. 13/856,476 mailed on Oct. 5, 2015, Fan et al., "3D Data Environment Navigation Tool", 13 pages.

Office action for U.S. Appl. No. 13/906,343, mailed on Oct. 8, 2015, Ruble et al., "Facetted Browsing", 21 pages.

Office action for U.S. Appl. No. 13/760,032 mailed on Sep. 10, 2015, Ruble et al., "3D Data Environment Disambiguation Tool", 31 pages.

Office action for U.S. Appl. No. 13/711,629 mailed on Sep. 10, 2015, Ruble et al., "Generating Queries Based Upon Data Points in a Spreadsheet Application", 33 pages.

Office action for U.S. Appl. No. 13/856,116, mailed on Dec. 21, 2015, Ruble et al., "Displaying Temporal Information in a Spreadsheet Application", 10 pages.

Office action from U.S. Appl. No. 13/760,032, mailed on Feb. 12, 2016, Ruble et al., "3D Data Environment Disambiguation Tool", 34 pages.

* cited by examiner

GENERATING SCENES AND TOURS IN A SPREADSHEET APPLICATION

CROSS-REFERENCE TO RELATED APPLICATION

This application claims priority to U.S. Provisional Patent Application No. 61/681,851 entitled "3D Visualization of Data in Geographical and Temporal Contexts," filed Aug. 10, 2012, which is incorporated herein by reference in its entirety.

BACKGROUND

A spreadsheet application, reporting application, or other data presentation application may support presentation of data in two-dimensional and/or three-dimensional pie charts, graphs, bar charts, other representations, or the like. Users therefore may graphically represent some data in charts or graphs in an attempt to gain insight into the data, into relationships among data points, to understand trends associated with the data, or the like. Some data, however, may not be readily susceptible to graphic representation. As such, some data may not be appreciated and/or viewable by users using graphs and/or charts.

For example, some data may include geographical and/or temporal components. Charts and graphs may be used to present geographical and/or temporal information, but such displays of this type of information may be limited and/or may not provide a viewer or consumer with any insight into the data from a geographical and/or temporal perspective. Similarly, some data may change over time with respect to locations and/or with respect to other portions of data. Detecting such trends and/or data changes may be difficult using charts and/or graphs.

To address this issue, some users or consumers may generate multiple graphs or charts for a particular data set, wherein each of the multiple graphs or charts may represent a different aspect of the data. Generating a number of charts or graphs may be time consuming and/or difficult, and some trends or other aspects of the data may not be appreciated when various aspects of the data are graphically represented in separate graphs and/or charts. Thus, users may be able to view temporal and/or geographical information, but the presentations of the data may be inadequate to discover the relationships of the data in the geographical and temporal contexts and/or with respect to other aspects of the data.

It is with respect to these and other considerations that the disclosure made herein is presented.

SUMMARY

Concepts and technologies are described herein for generating scenes and tours in a spreadsheet application. In accordance with the concepts and technologies disclosed herein, a computer system can execute a visualization component. The visualization component can be included in a spreadsheet application and/or can be configured to present visualizations of data. The data can include, for example, data from a variety of sources such as SQL data, ODATA providers, TXT files, spreadsheet programs, or the like (herein referred to as "spreadsheet data"). It also should be understood that "spreadsheet data" can be provided by various sources, services, or applications, and need not necessarily be provided by a spreadsheet application directly. As used herein, a "visualization" can include an animated rendering of spreadsheet data. In some embodiments, the visualization can include presentation of data on a map, globe, or other surface that can provide geographical context. In some other embodiments, the visualization can include non-geographic data presented in other ways. Thus, while the visualizations can be based, at least in part, upon geographical information and/or time values, timestamps, and/or other temporal information included in the data, this is not necessarily the case and should be understood as one example embodiment of the concepts and technologies disclosed herein.

Additionally, embodiments of the concepts and technologies disclosed herein can be used to create and/or modify scenes. "Scenes" can include animated visualizations of data with respect to a particular data set, location, time, time range, or the like. The scenes can be created, named, modified, ordered, and/or reordered by users. Additionally, the concepts and technologies disclosed herein can be used to generate a tour. A "tour" can include one or more scenes, and can be generated by users and/or by the visualization component. Thus, multiple animated visualizations of one or more data sets can be generated and saved as a tour. The visualization component can be configured to generate various user interfaces for creating and/or modifying tours, various scenes included in the tours, and/or various views or visualizations included in the scenes.

According to one aspect, a computer system executes a visualization component. The visualization component can be configured to obtain data such as, for example, spreadsheet data. The visualization component can generate a visualization of the spreadsheet data. A user or other entity can create a tour and create one or more scenes to be included in the tour. The scenes can be configured by the user and the tour can be saved. Changes to the scenes and/or the tours can be detected by the visualization component and saved. According to various embodiments, the visualization component can generate and/or present multiple user interfaces for creating tours, creating scenes, configuring the tours and/or the scenes, configuring views of data presented in the scenes, and/or selecting and/or configuring data included in the scenes.

According to another aspect, the visualization component can be configured to present the tour. The tour can be presented as a visual or audio-visual presentations, for example a video, which can be interrupted at any time by selection of a pause command and/or other input for pausing playback of the tour. When the tour is paused, changes to the scenes and/or the tour can be made via the user interface presenting the tour and/or scene, and the changes can be saved to the tour. The visualization component also can be configured to generate a video file corresponding to the tour. Thus, for example, the tour can be exported as a video file that can be viewed by a device capable of video file playback.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
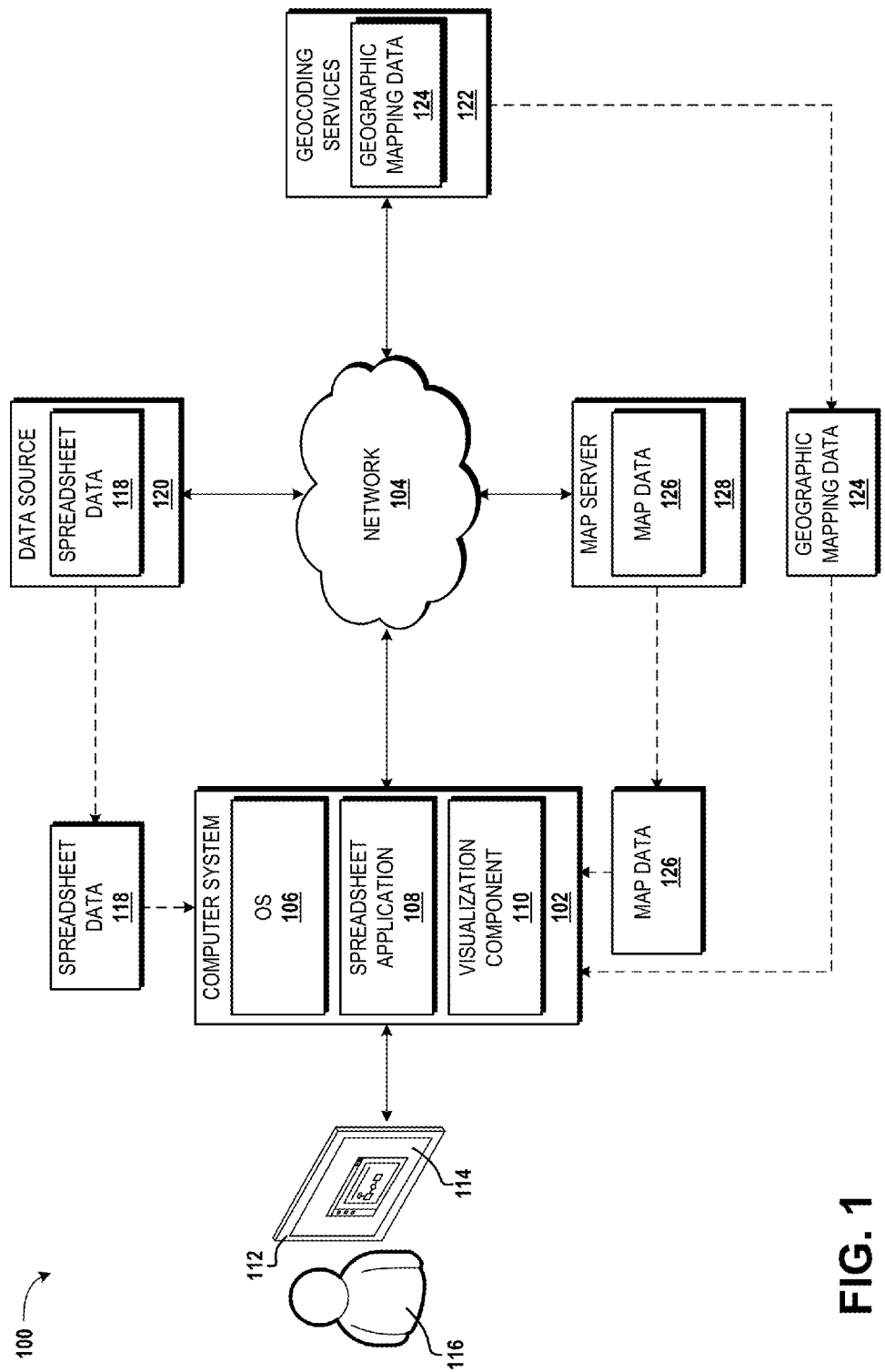
FIG. 1 is a system diagram illustrating an illustrative operating environment for the various embodiments disclosed herein.

The following detailed description is directed to concepts and technologies for generating scenes and tours in a spreadsheet application. According to the concepts and technologies described herein, a computer system can execute a visualization component. The visualization component can be configured to receive data such as, for example, spreadsheet data. While the example of a spreadsheet application and spreadsheet data is referred to herein for example purposes, it should be understood that some embodiments of the visualization component can be included in other applications or environments and/or can be used to generate visualizations of data other than the described spreadsheet data. As such, this example should be understood as being illustrative and should not be construed as being limiting in any way.

The visualization component can generate a visualization of the spreadsheet data. The visualization can include a view of the spreadsheet data. In some embodiments, the visualization includes a three-dimensional representation of the spreadsheet data on a map, globe, or other surface that can convey geographic information. Temporal information associated with the spreadsheet data can be shown by animating the views. In some embodiments, a tour having one or more scenes can be created, and scenes can be added to, deleted from, and/or modified within the tour. The scenes can correspond to animated visualizations of the views and therefore can represent data over temporal and/or geographic contexts.

The scenes and/or tours can be interacted with via one or more user interfaces. Changes to the scenes and/or the tours can be detected by the visualization component and saved. According to various embodiments, the visualization component can generate and/or present multiple user interfaces for creating tours, creating scenes, configuring the tours and/or the scenes, configuring views of data presented in the scenes, and/or selecting and/or configuring data included in the scenes. The visualization component also can be configured to present the tour. The tour can be presented as a video or other animated presentation that can be interrupted, for example by detecting selection of a pause command and/or other input for pausing playback of the tour.

In some configurations, when the tour is paused, changes to the scenes and/or the tour can be made via the user interface in an edit mode by presenting the tour and/or scene. Changes to the tour made in the edit mode may be saved when a user saves the workbook. The visualization component also can be configured to generate a video file corresponding to the tour that can be exported for playback on other systems or devices.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for generating scenes and tours in a spreadsheet application will be presented.

Referring now to FIG. 1, aspects of one operating environment 100 for the various embodiments presented herein will be described. The operating environment 100 shown in FIG. 1 includes a computer system 102 operating as a part of and/or in communication with a communications network ("network") 104. According to various implementations of the concepts and technologies disclosed herein, the functionality of the computer system 102 can be provided by a cloud-based computing platform that can be provided by one or more application servers, Web servers, data storage systems, network appliances, dedicated hardware devices, and/or other server computers or computing devices.

According to some other embodiments, the computer system 102 can include a user computing device, such as a tablet computing device, a personal computer ("PC"), a desktop computer, a laptop computer, a notebook computer, a cellular phone or smartphone, other mobile computing devices, a personal digital assistant ("PDA"), or the like. Some example architectures of the computer system 102 are illustrated and described below with reference to FIGS. 6-8. For purposes of illustrating and describing the concepts and technologies disclosed herein, the functionality of the computer system 102 is described herein as being provided by a server computer. In light of the above alternative embodiments of the computer system 102 described above, it should be understood that this example is illustrative, and should not be construed as being limiting in any way.

The computer system 102 can be configured to execute an operating system 106 and one or more application programs such as, for example, a spreadsheet application 108, a visualization component 110, and/or other application programs. The operating system 106 is a computer program for controlling the operation of the computer system 102. The application programs are executable programs configured to execute on top of the operating system 106 to provide the functionality described herein for generating scenes and tours in a spreadsheet application.

In particular, the spreadsheet application 108 can be configured to create, manipulate, store, and/or otherwise interact with tabular or other structured data such as spreadsheets. According to some embodiments of the concepts and technologies disclosed herein, the functionality of the spreadsheet application 108 can be provided by a member of the MICROSOFT EXCEL family of spreadsheet applications from Microsoft Corporation of Redmond, Wash. In some other embodiments, the functionality of the spreadsheet application 108 can be provided by a database application, a data reporting application, a data presentation application, combinations thereof, or the like.

According to some implementations, the spreadsheet application 108 can be executed by one or more server computers in the computer system 102, such as application servers and/or Web servers. Thus, the functionality of the spreadsheet application 108 can be accessed by other computing devices and/or accessed at the computer system 102. In the illustrated embodiment, the functionality of the spreadsheet application 108 can be accessed and/or interacted with by a user computing device 112. The functionality of the user computing device 112 can be provided by, for example, a tablet computing device, a smartphone, a laptop computer, a desktop computer, other computing devices, combinations thereof, or the like. The user computing device 112 can communicate with the computer system 102 over one or more links or networks such as, for example, the network 104, a private network, a direct wireless or wired connection, the Internet, and/or combinations of these and other networks and/or communication links.

Although not visible in FIG. 1, the user computing device 112 can execute one or more client applications. The client applications can include Web browser applications and/or other applications for accessing the spreadsheet application 108 executing on the computer system 102. In some embodiments, the spreadsheet application 108 can be executed locally on the user computing device 112 or other devices that can include the functionality of the computer system 102 described herein. The spreadsheet application 108 can be implemented as hardware, software, and/or a combination of the two. Furthermore, the spreadsheet application 108 can include one or more application program modules and other components on the user computing device 112, the computer system 102, and/or other computing platforms. As will be explained in more detail herein, the user computing device 112 can generate one or more user interfaces ("UIs") 114 to present temporal information to a user 116.

According to various embodiments, the spreadsheet application 108 can be configured to generate, manipulate, and/or store tabular or other structured data that can be included in spreadsheet data 118. The spreadsheet data 118 also can be stored in tables of a database, objects stored in an object store, or the like. Because the functionality of the spreadsheet application 108 is generally understood, the spreadsheet application 108 will not be described in additional detail herein.

According to various implementations, the spreadsheet data 118 can be obtained by the computer system 102 from a local or remote data source 120. In some embodiments, the data source 120 can include a memory, disk drive, or other data storage element of or associated with the computer system 102. In some other embodiments such as the embodiment illustrated in FIG. 1, the data source 120 can include a network drive, a server computer operating as a part of and/or in communication with the network 104, a database or other real or virtual data storage elements, and/or other data storage devices. As such, it should be understood that the data source 120 can include almost any type of data storage device that is local to and/or remote from the computer system 102.

The visualization component 110 can be executed by the computer system 102 to provide the functionality described herein for displaying temporal information in a spreadsheet application. In particular, the visualization component 110 can be configured to obtain the spreadsheet data 118 from the spreadsheet application 108 and/or directly from the data source 120, and to generate, based upon the spreadsheet data 118, three dimensional visualizations of the spreadsheet data 118 in a geographical and/or temporal context. In some embodiments, the visualization component 110 can be implemented as a component of the spreadsheet application 108, and in some embodiments, the visualization component 110 can be implemented as a component separate from the spreadsheet application. Thus, while the spreadsheet application 108 and the visualization component 110 are illustrated as components of the computer system 102, it should be understood that each of these components, or combinations thereof, may be embodied as or in stand-alone devices or components thereof operating on or in communication with the network 104 and/or the computer system 102. Thus, the illustrated embodiment is illustrative, and should not be construed as being limiting in any way.

In some embodiments, the visualization component 110 may be implemented as a plugin or add-in for the spreadsheet application 108. In some other embodiments, the visualization component 110 can include a service and/or set of application programming interfaces ("APIs") that can provide the functionality described herein. Thus, it should be appreciated that the visualization component 110 can be implemented as hardware, software, or a combination thereof According to various embodiments of the concepts and technologies disclosed herein, the visualization component 110 can be configured to access one or more geocoding services 122. The geocoding services 122 can be configured to map geographical data included in the spreadsheet data 118 to geographic information. Thus, for example, the visualization component 110 can provide geographical data included in the spreadsheet data 118 such as, for example, a street address, a city, a state, a ZIP code, or the like, to the geocoding services 122. The geocoding services 122 can map this geographical data to latitude and longitude information and/or other geocoded location data. Thus, it can be appreciated that the geocoding services 122 can be called by the computer system 102 via one or more APIs exposed by the geocoding services 122, though this is not necessarily the case. Furthermore, the geocoding services 122 can be configured to provide geographic mapping data 124 representing mappings of the geographical data to the geocoded location data to the computer system 102, though this is not necessarily the case.

In some embodiments, the visualization component 110 can access the geocoding services 122 via one or more networks such as, for example, the network 104, the Internet, other networks, and/or a combination thereof. In some other embodiments, the geocoding services 122 can be implemented on the computer system 102. In one contemplated embodiment, the geocoding services 122 are implemented as a component of the visualization component 110. It should be understood that this embodiment is illustrative, and should not be construed as being limiting in any way.

The visualization component 110 also can be configured to obtain and/or access map data 126. The map data 126 can be used to provide geolocation and/or graphical data for the creation of the three-dimensional geographical maps as described herein. The visualization component 110 may be configured to obtain or access the map data 126 from or at a computing device such as, for example, a map server 128. In some embodiments, the functionality of the map server 128 can be provided by a mapping application executed by a search engine such as the BING search engine from Microsoft Corporation in Redmond, Wash. Because the functionality of the map server 128 can be provided by additional and/or other devices and/or applications, it should be understood that this embodiment is illustrative, and should not be construed as being limiting in any way.

The computer system 102 can access the map server 128 via one or more networks such as, for example, the network 104. In some embodiments, the visualization component 110 can be configured to access map tiles from the map data 126, and to stich the map tiles together over a three-dimensional globe armature to create a three-dimensional geographic globe. The visualization component 110 can be configured to use geocoded location data such as latitude and longitude data from the geocoding services 122 to place visualizations of data included in the spreadsheet data 118 on the three-dimensional geographic globe. As such, various embodiments of the visualization component 110 can be configured to generate displays of geographic data.

The user 116 may interact with the spreadsheet application 108 and the visualization component 110 to create and/or navigate a three-dimensional visualization of the spreadsheet data 118 through a display of the user computing device 112. In some embodiments, the user 116 may use one or more input devices of the user computing device 112 such as a touchscreen, a keyboard, a mouse, a game controller, combinations thereof, or the like. The UIs 114 can be presented on the touchscreen, a monitor, a display, other display surfaces or devices, combinations thereof, or the like.

The visualization component 110 can be executed by the computer system 102 to provide the functionality described herein for generating scenes and tours in a spreadsheet application. In particular, the visualization component can be configured to obtain data such as, for example, the spreadsheet data 118. The visualization component 110 can be configured to generate a visualization of the spreadsheet data 118, as explained above. Thus, for example, the visualization component 110 can be configured to generate a three-dimensional representation of the spreadsheet data 118 on a surface such as a map, globe, or the like.

The visualization component 110 also can be configured to create a tour. As used herein, a "tour" can correspond to a file or other collection of data that can define or include a number of "scenes." The scenes can include animated visualizations of data generated by the visualization component 110, as will be explained in more detail herein. Thus, a tour can correspond to and/or define a number of scenes, and the scenes can correspond to and/or define a number of animation frames of an animated visualization of data. According to various embodiments, as will be explained in more detail below, the tour can be generated by the visualization component 110 based upon input from a user and/or can be generated automatically by the visualization component 110 based upon an analysis of the spreadsheet data 118.

The visualization component 110 also can be configured to create scenes to be added to the tour. In some embodiments, the visualization component 110 is configured to generate and present the UIs 114, wherein the UIs 114 include controls for creating tours and/or adding scenes to the tours. The UIs 114 also can include controls for naming or renaming tours; naming or renaming scenes; ordering and/or reordering scenes of a tour; setting durations of scenes; configuring data included in scenes; and/or configuring one or more views of the data included in the scenes. The UIs 114 also can include options for playing a tour and/or other options for controlling playback of the tour. Some example UIs 114 for interacting with the visualization component 110 are illustrated and described below with reference to FIGS. 5A-5J.

The visualization component 110 can detect changes made to scenes, and save the tour including the changes made to the scenes. Thus, the visualization component 110 can support creation and/or configuration of tours and/or scenes included in the tours via various UIs 114. According to some embodiments of the concepts and technologies disclosed herein, the visualization component 110 also can generate and/or present UIs 114 for playing tours and/or capturing changes made to tours from within a paused tour.

In particular, the visualization component 110 can detect input for playing a tour. The visualization component 110 can generate a playback screen for watching the tour. The tour can be presented in a full screen interface, in a windowed interface, and/or in other interfaces. During playback of the tour, the visualization component 110 can monitor interactions with a UI 114 presenting the tour to determine if input for pausing playback of the tour has been detected. If input for pausing playback, for example a pause command, is detected, the visualization component 110 can save a playback position of the tour at the time the pause command is detected and monitor interactions with the UI 114 to detect input for resuming playback of the tour. The playback position can be saved as a frame number, a time value, a scene name or number, combinations thereof, or the like.

Other controls in playback may include, but are not limited to, "back," "previous scene," "play," "pause," "escape," "repeat," and "next scene." While in playback, accessing the back control may cause the initiation of an edit mode. The escape control may also cause the initiation of an edit mode or may exit the tour entirely. Changes made to the tour during the edit mode may be saved once the edit mode is exited. The repeat control may cause the continuous playback of the tour. The previous scene control may cause the tour to return to the scene prior to the current scene. The next scene control may cause the tour to move forward to a scene following the current scene.

When the tour is paused, the visualization component 110 also can allow interactions with the tour and/or the scenes of the tour. Changes made to the scenes and/or the tour can be saved by the visualization component 110 by saving a new version of the tour and/or by updating the tour. If input for resuming playback of the tour is detected by the visualization component 110, the playback can be resumed from the saved playback position. The visualization component 110 can save changes made to the tour and/or the scenes after playback has completed, during playback, during the edit mode, and/or at other times. These and other aspects of the concepts and technologies disclosed herein for generating tours and scenes in a spreadsheet application will be illustrated and described in additional detail herein.

FIG. 1 illustrates one computer system 102, one network 104, one user computing device 112, one data source 120, one instance of geocoding services 122, and one map server 128. It should be understood, however, that some implementations of the operating environment 100 can include multiple computer systems 102, multiple networks 104, multiple user computing devices 112, multiple data sources 120, multiple instances the geocoding services 122, and/or multiple map servers 128. As such, the illustrated embodiment of the operating environment should be understood as being illustrative, and should not be construed as being limiting in any way.

Figure 2:
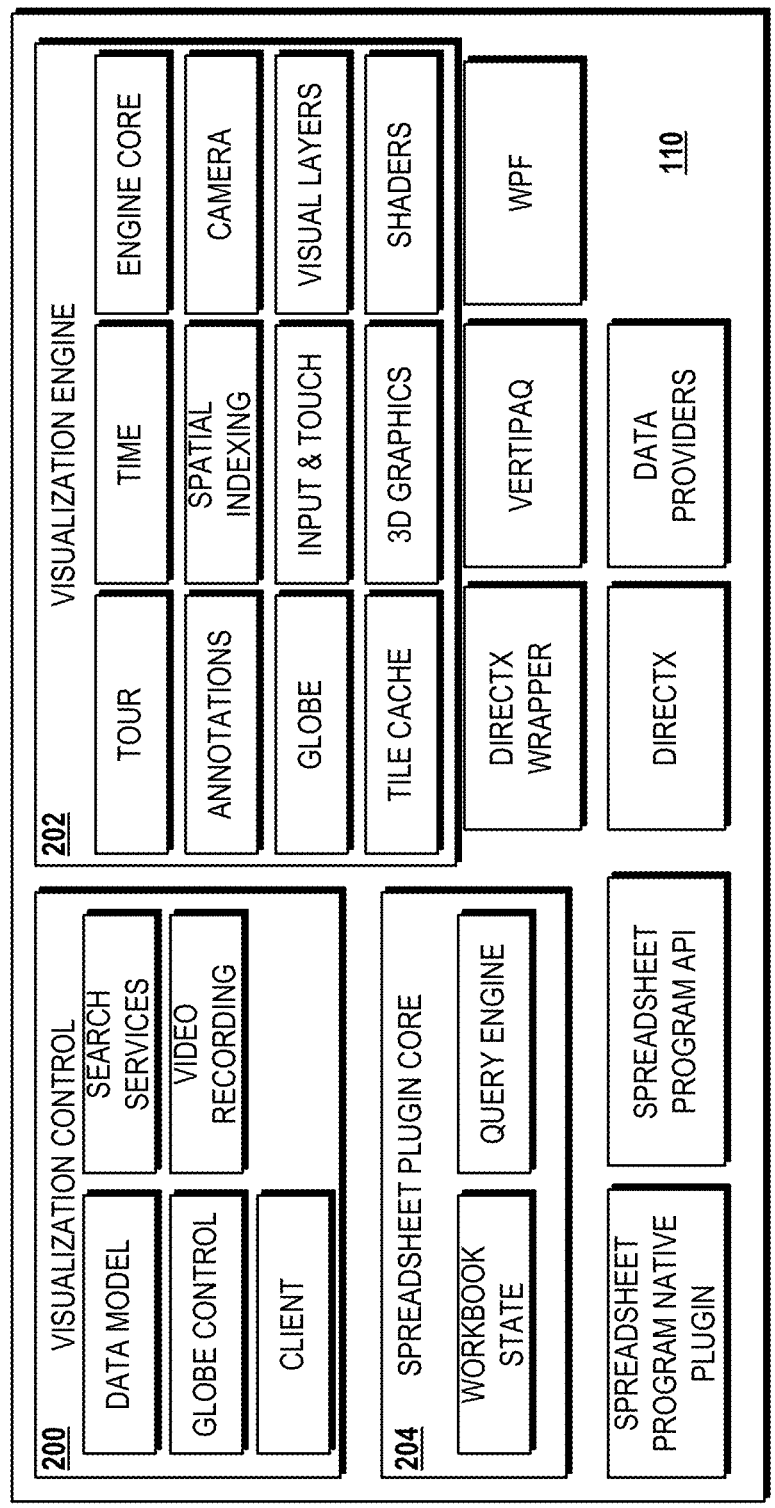
FIG. 2 is a block diagram showing aspects of a visualization component, according an illustrative embodiment.

Turning now to FIG. 2, additional aspects of the visualization component 110 will be presented, according to one illustrative embodiment. In particular, FIG. 2 provides further details regarding architecture and subcomponents of the visualization component 110, according to some embodiments. The visualization component 110 can include a number of components and/or subsystems including, but not limited to, a visualization control 200, a visualization engine 202, a spreadsheet plugin core 204, and/or other components and/or subsystems.

The visualization control 200 can include functionality for representing data, performing searches and/or providing search services, a globe control for visualizing and/or presenting representations of the globe, video recording functionality for recording animations and/or videos of illustrated tours, and a client. The visualization engine 202 can include functionality for generating a tour including multiple scenes, images, and/or animation sequences; functionality for measuring and/or representing time in the visualization space; an engine core for providing the visualization component functionality described herein; annotations functionality for generating and/or rendering two-dimensional and/or three-dimensional annotations; spatial indexing functionality; and camera functionality. The visualization engine 202 also can include globe models and/or functionality for representing the globe; input and touch modules for interpreting touch and/or multi-touch commands as input; visual layers functionality for representing and/or interacting with layers of a visualization space; a tile cache for storing map tiles; a three-dimensional graphics module for generating and/or rendering three-dimensional visualizations; and shaders for providing shading of generated and/or rendered three-dimensional objects.

In some embodiments, the shaders can include or implement a number of algorithms to facilitate the rendering of the three-dimensional geographical visualizations of data described herein. For example, the visualization component 110 can implement a dark aura effect for disambiguating visualization of a number of similarly colored objects. A dark aura effect can include a visual treatment that allows a viewer, for example the user 116, to differentiate between items in a three-dimensional visualization space. When there are multiple, similarly colored columns in a three-dimensional visualization or view, some of these columns may be next to and/or behind one another in the three-dimensional view. Thus, the multiple columns may appear to be grouped together and/or may look like a single polygon. In some embodiments of the concepts and technologies disclosed herein, the dark aura effect can be added around one or more of the columns, thereby allowing the one or more columns to appear to stand out from one another. Because other visual effects are possible and are contemplated, it should be understood that this example is illustrative, and should not be construed as being limiting in any way.

In another example, the visualization component 110 may implement a GPU-based framework for asynchronous hit testing for large number of arbitrary three-dimensional elements. This may comprise adding "out-of-channel" color information to pixels of the objects rendered in the three-dimensional visualization that may be invisible to the viewer, but can contain information identifying the object. Thus, if a user taps, clicks, or otherwise interacts with a point in the three-dimensional visualization, the identity of the object represented by the selected pixel can be known without deconstructing the three-dimensional visualization and determining the object rendered at the selected location. This may be implemented in the GPU.

The spreadsheet plugin core 204 can include functionality for storing workbook state information, as well as a query engine for generating and/or executing queries against various data sources. In some embodiments, the query engine can be configured to generate a query based upon data stored in the spreadsheet data 118, and to submit the queries to a search engine. It should be understood that this embodiment is illustrative, and should not be construed as being limiting in any way.

The visualization component 110 also can include various other components and/or subsystems such as, for example, a spreadsheet program native plugin and a spreadsheet program API such as, for example, a component object model ("COM") API, a Java API, and/or APIs developed using other languages such as, for example, Perl, Apple Cocoa framework, or the like. The visualization component 110 also can include various graphics plugins and/or APIs such as the illustrated DIRECTX APIs, API call emulators such as the illustrated DIRECTX WRAPPER, a WINDOWS Presentation Foundation ("WPF") subsystem, combinations thereof, or the like. The visualization component 110 also can include analytics engines such as the illustrated VERTIPAQ engine and/or modules associated with other data providers, if desired. As such, it should be understood that the spreadsheet data 118 described herein can be obtained from various data sources including, but not limited to, various spreadsheet applications, databases, or other applications, services, and/or data structures, and that the embodiments disclosed herein are not limited to obtaining the spreadsheet data 118 from the spreadsheet application 108. Furthermore, as explained above, the spreadsheet data 118 is not necessarily data from a spreadsheet application 108, as this data can come from various sources as explained above. Also, it should be appreciated that the visualization component 110 can include additional and/or alternative functionality not shown in FIG. 2. As such, the embodiment illustrated in FIG. 2 should be understood as being illustrative and should not be construed as being limiting in any way.

Figure 3:
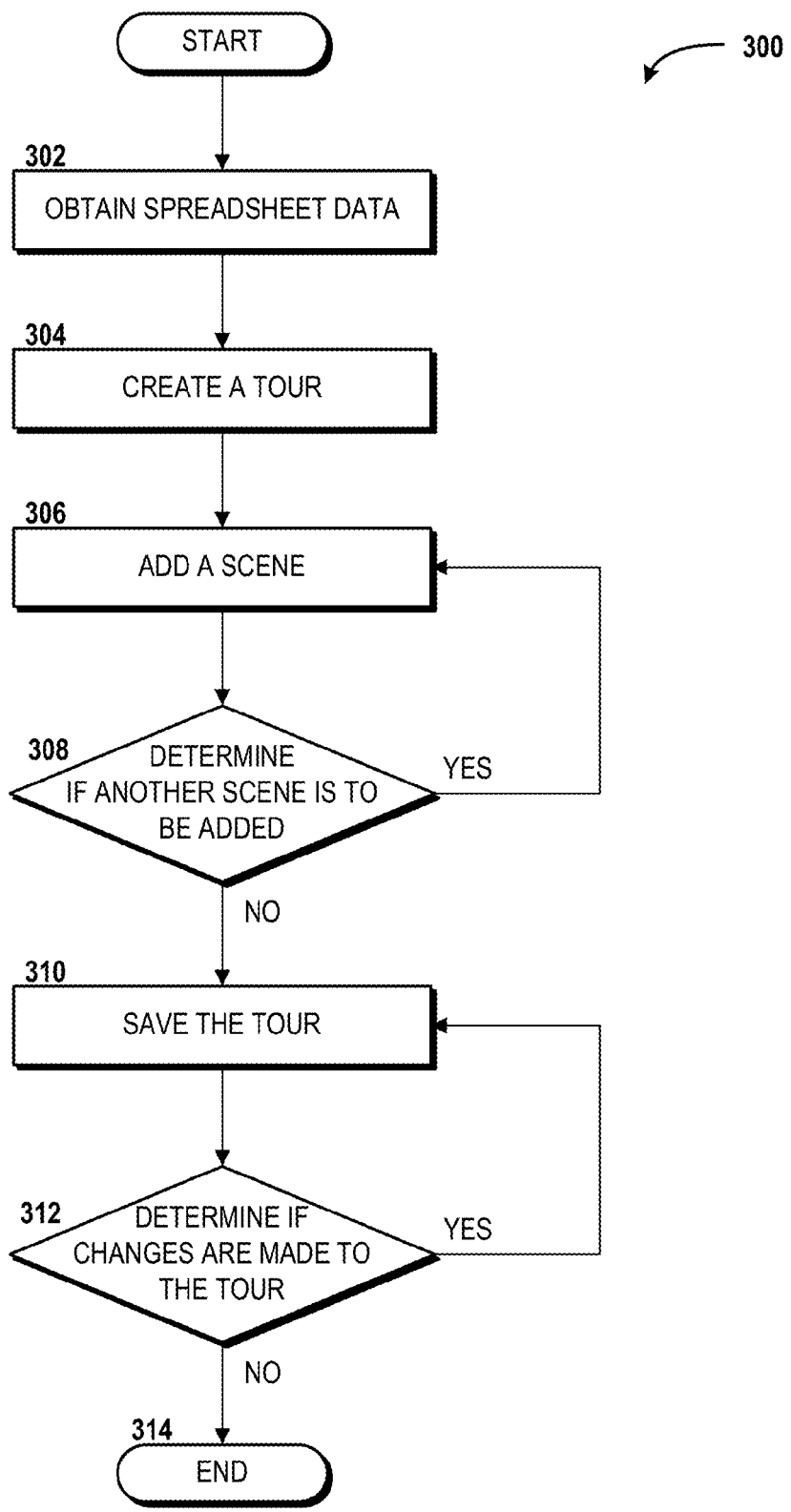
FIG. 3 is a flow diagram showing aspects of a method for generating tours and scenes in a spreadsheet application, according to an illustrative embodiment.

Turning now to FIG. 3, aspects of a method 300 for generating tours and scenes in a spreadsheet application will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods disclosed herein can be ended at any time and need not be performed in their respective (or collective) entireties. Some or all operations of the methods disclosed herein, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the computer system 102 via execution of one or more software modules such as, for example, the visualization component 110. It should be understood that additional and/or alternative devices and/or network nodes can provide the functionality described herein via execution of one or more modules, applications, and/or other software including, but not limited to, the visualization component 110. Thus, the illustrated embodiments are illustrative, and should not be viewed as being limiting in any way.

The method 300 begins at operation 302, wherein the computer system 102 obtains spreadsheet data 118. As explained above, the spreadsheet data 118 can include various types of information or content such as, for example, spreadsheet files, database application data, and/or other types of information. In one contemplated embodiment, the spreadsheet data 118 corresponds to a spreadsheet file such as a file generated by a member of the MICROSOFT EXCEL family of spreadsheet application software products from Microsoft Corporation in Redmond, Wash. Other contemplated spreadsheet applications include, but are not limited to, a member of the GOOGLE DOCS family of programs, a member of the OPENOFFICE family of programs, a member of the APPLE IWORK NUMBERS family of programs, and/or other spreadsheet, table, and/or database programs. The spreadsheet data 118 can be obtained from a data storage device or component associated with the computer system 102. Some examples of data storage devices are described in more detail below with reference to FIGS. 6-8. In some other embodiments, the spreadsheet data 118 can be stored at or hosted by a remote storage device or resource such as the data source 120 described herein. Thus, the spreadsheet data 118 can be obtained by the computer system 102 via communications with the data source 120 and/or from a local data storage device.

Although not shown in FIG. 3, it should be understood that the computer system 102 can create a visualization from the spreadsheet data 118, as explained above. Thus, operation 302 can include creating the visualization and/or presenting the visualization to a user or other entity. As explained above, the visualization can include a three-dimensional representation of the spreadsheet data 118, which can be presented on a map, globe, or other surface. It should be understood that this embodiment is illustrative, and should not be construed as being limiting in any way.

From operation 302, the method 300 proceeds to operation 304, wherein the computer system 102 creates a tour. As explained above, a tour can include a file for presenting animated visualizations of the spreadsheet data 118. According to various embodiments, the tour can be created as a file having multiple scenes, wherein the scenes of the tour can be generated by the visualization component 110 based upon an analysis and/or understanding of the spreadsheet data 118.

In some other embodiments, the tour can be created as a file that does not include any scenes, as in the embodiment illustrated in FIG. 3. In particular, a user or other entity can select an option to create the tour and then add scenes to the tour, wherein the scenes can include animated visualizations of the spreadsheet data 118. The one or more scenes of a tour can be added to the tour. One example user interface for creating a tour is illustrated and described in more detail below with reference to FIG. 5A. In the embodiment of method 300 shown in FIG. 3, the tour is created without any scenes, and scenes can be added by the computer system 102, as will be explained in more detail below.

From operation 304, the method 300 proceeds to operation 306, wherein the computer system 102 adds a scene to the tour. The computer system 102 can detect selection of an option to add the scene to the tour added in operation 306. One example user interface for adding a scene to a tour is illustrated and described in more detail below with reference to FIG. 5B. As explained above, the scene can include an animated visualization of the spreadsheet data 118 and/or a portion thereof. In adding the scene to the tour, the computer system 102 can obtain data defining a duration of the scene, a time range of the data shown in the scene, camera effects and/or transitions applied to the animated scene, data labels and/or annotations, combinations thereof, or the like. As used herein, a "transition" is the manner in which a tour changes from one scene to a consecutive scene. In some configurations, a transition has a duration, which may be a default duration or may be specified by a user. Also as used herein, an "effect" is a visualization technique, or motion, used within a scene. In some configurations, an effect may persist the entire duration of a scene.

In some other embodiments, the scene can be added to the tour without any specification of the scene contents. Thus, the computer system 102 can add one or more scenes to the tour and can obtain data for modifying the scene after adding the scenes to the tour. In some other embodiments, the computer system 102 can be configured to add the scene to the tour when the tour is created. As such, it should be understood that the functionality described herein with reference to operation 306 can be included within and/or can be performed in response to the functionality described with reference to operation 304. It should be understood that this embodiment is illustrative, and should not be construed as being limiting in any way.

From operation 306, the method 300 proceeds to operation 308, wherein the computer system 102 determines if another (an additional or a further) scene is to be added to the tour. The computer system 102 can determine that another scene is to be added to the tour by detecting input for adding a scene, as described above with reference to operation 306. If the computer system 102 determines, in operation 308, that another scene is to be added to the tour, the method 300 can return to operation 306, and the additional scene can be added. It can be appreciated that the computer system 102 can be configured, via multiple iterations of operations 306-308, to add multiple scenes to the tour, though this is not necessarily the case. As such, operations 306-308 can be repeated until the computer system 102 determines, in any iteration of operation 308, that another scene is not to be added to the tour.

Although not explicitly illustrated in FIG. 3, it should be understood that a user or other entity can interact with multiple user interfaces and/or otherwise interact with the visualization component 110 to configure a scene added in operation 308 and/or to configure the tour created in operation 304, as mentioned above with reference to operation 304. For example, the visualization component 110 can be configured to allow a tour to be named; to set a duration of the tour; to arrange, name, order, add, delete, and/or reorder scenes of the tour; to add or modify annotations within a scene; to create or add legends; to apply themes; to set or modify data colors, shapes, and/or visualization types; to set or modify time characteristics; to add or modify screen titles; to change data and/or a data set used to generate a scene or view associated with the scene; to set and/or modify viewing angles associated with the scenes and/or the tour; to add or modify transitions or camera effects associated with the scenes; combinations thereof; or the like. Some example user interfaces for configuring the tour and/or scenes of the tour are illustrated and described in more detail below with reference to FIGS. 5A-5F. Because the tour and/or scenes can be configured in additional and/or alternative ways, it should be understood that these example user interfaces are illustrative, and should not be construed as being limiting in any way.

If the computer system 102 determines, in operation 308, that another scene is not to be added to the tour, the method 300 can proceed to operation 310. In operation 310, the computer system 102 can save the tour created in operation 304. It can be appreciated that the scenes added in one or more iterations of operation 306 also can be saved in operation 310. The tour and/or scenes can be saved, in some embodiments, as the spreadsheet data 118. In some other embodiments, the computer system 102 can be configured to save the tour and/or scenes as other forms of data that can be stored at the computer system 102 and/or shared with other devices.

From operation 310, the method 300 can proceed to operation 312. In operation 312, the computer system 102 can determine if any changes to the tour have been made. Thus, for example, the computer system 102 can determine if the computer system 102 has detected any changes to the tour and/or scenes of the tour such as, for example, the various tour and/or scene modifications discussed above with reference to operation 308.

If the computer system 102 determines, in operation 312, that changes have been made to the tour, the method 300 can return to operation 310, and the computer system 102 can save the changed tour. It can be appreciated that operations 310-312 can be repeated until the computer system 102 determines, in any iteration of operation 312, that changes have not been made to the tour. If the computer system 102 determines, in operation 312, that changes have not been made to the tour, the method 300 proceeds to operation 314. The method 300 ends at operation 314.

The method 300 described above has been described as an embodiment wherein the computer system 102 generates the tour based upon user input. In some embodiments, the computer system 102 also can be configured to generate the tours automatically in what can be referred to as an "auto tour." In particular, the computer system 102 can be configured to provide an option to generate an "auto tour" and/or provide an option to request automatic generation of one or more scenes. In some embodiments, a user may request an auto tour via selection of a UI control and/or the computer system 102 can be configured to offer an auto tour without user input.

In some configurations, the computer system 102 may be configured to detect a user selection of various aspects of the auto tour. For example, the user, or other entity, may be able to specify a start time and an end time of the auto tour. This time, which may be called "tour time," specifies the duration of a tour. In some configurations, if time is a component of the spreadsheet data 118 rendered in the visualization, the time may be adjusted based on the tour time. The time component in the spreadsheet data 118 may be termed "data time." For example, if the spreadsheet data 118 includes time in one dataset as 20 minutes and time in another dataset as 10 minutes, the 20 minute time may be adjusted for visualization in the full 5 minutes, whereby the 10 minute time may be adjusted to a percentage of the 5 minutes. In this example, because 10 minutes is one half of 20 minutes, the 10 minute time may be rendered in the tour as lasting 2.5 minutes (or one half of the 5 minute tour time). The present disclosure is not limited to any particular manner in which either the tour time or the data time may be adjusted.

The computer system 102 may also be configured to commence an auto tour at various locations, such as a start location, depending on the spreadsheet data 118. For example, the computer system 102 may be configured to analyze the spreadsheet data 118 to determine "hot spots" or nexus of data in the spreadsheet data 118. The visualization component 110 may then commence the auto tour at the nexus of data. Further, the visualization component 110 may be configured to adjust the scene effect to place the camera at various locations of data for times depending on the data. For example, the camera may be placed at the nexus of the spreadsheet data 118 for a longer period of time in the tour than at a data point having little relation to the other data in the spreadsheet data 118. The present disclosure is not limited to any particular manner in which the auto tour may generate the tour.

According to various implementations of the auto tour, the computer system 102 can be configured to generate one or more scenes, or options for generating one or more scenes, and provide the options or the scenes to a user via the UIs 114. The scenes can include, but are not limited to, scenes showing minimum values in the spreadsheet data 118, maximum values in the spreadsheet data 118, data sets having a greatest variation or distribution, fastest growing or shrinking values in the spreadsheet data 118, or the like. Some examples of the UIs 114 for requesting auto tours and/or some example auto tour scenes are illustrated and described below with reference to FIGS. 5H-5I.

Thus, it can be appreciated that the method 300 for generating the tours can be performed by the computer system 102 without user input and/or can be based upon an analysis of the spreadsheet data 118 to generate the tour, generate the scenes, and/or configure the scenes as described above. Additionally, in some embodiments the tours can be based upon one or more of the scenes mentioned above. It should be understood that a user or other entity can select one of multiple generated or suggested scenes of a tour and need not select all scenes of a tour. Similarly, the operations discussed below with reference to FIG. 4 can be executed by the computer system 102 during generation and/or configuration of an auto tour.

Figure 4:
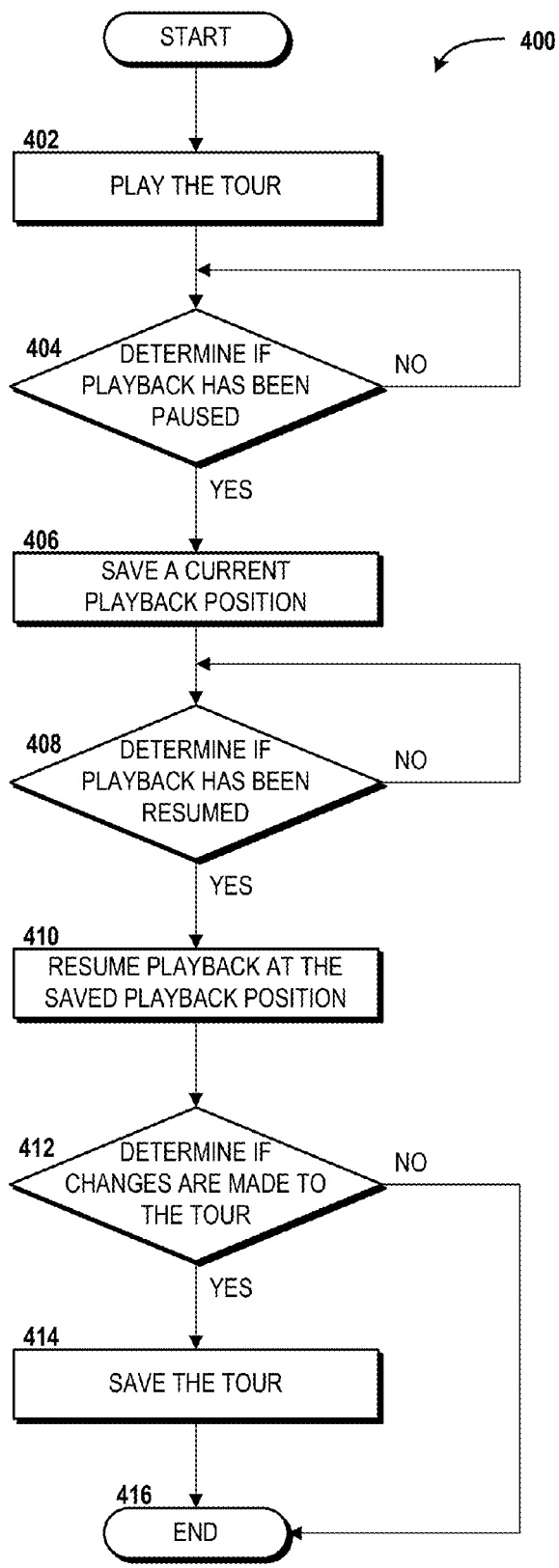
FIG. 4 is a flow diagram showing aspects of a method for modifying tours and scenes in a spreadsheet application, according to an illustrative embodiment.

Turning now to FIG. 4, aspects of a method 400 for modifying tours and scenes in a spreadsheet application will be described in detail. The method 400 begins at operation 402, wherein the computer system 102 plays a tour. The computer system 102 can play the tour in response to receiving a command to play the tour. For example, a user or other entity may enter a touch command, a mouse command, a voice command, and/or other types of input that, when detected by the computer system 102, cause the computer system 102 to begin playback of the tour. Because the tour can be played at additional and/or alternative times and/or because playback of the tour can be requested via other types of input, it should be understood that these examples are illustrative, and should not be construed as being limiting in any way.

From operation 402, the method 400 proceeds to operation 404, wherein the computer system 102 determines if playback of the tour has been paused. Thus, the computer system 102 can determine if input for pausing the tour is received at the computer system 102 at any time during playback. While operation 404 refers to "pausing" the tour, it should be understood that other commands can be recognized as pausing the playback such as, for example, a stop command, a wait command, combinations thereof, or the like.

If the computer system 102 determines, in operation 404, that playback of the tour has not been paused, the method 400 can repeat operation 404. As such, it can be appreciated that the computer system 102 can be configured to repeat operation 404 until the computer system 102 determines, in any iteration of operation 404, that playback of the tour has been paused. If the computer system 102 determines that playback of the tour has been paused, the method 400 can proceed to operation 406.

In operation 406, the computer system 102 can save a current playback position. Thus, the computer system 102 can be configured to store a playback position in a memory, a cache, or other temporary or permanent storage locations to indicate a playback position at a time at which the playback was paused in operation 404. The playback position can be saved as a frame number, as a scene identifier, as a time identifier, a bookmark, a named location, combinations thereof, or the like.

Although not explicitly shown in FIG. 4, various embodiments of the concepts and technologies disclosed herein can be configured to enable interactions with the views and/or the spreadsheet data 118 associated with a view from within the tour. In particular, a view shown in a tour can be interacted with by a user or other entity using the view shown in the tour as a starting point. Thus, for example, the computer system 102 may receive input for pausing playback of the tour. The view displayed at that point of the tour may be persisted to allow a user or other entity to interact with the visualization of the underlying spreadsheet data 118 from that view, which as explained above can define, for example, an orientation, a scope, a view angle, a field of view, a viewing distance, a tilt angle, time control options, brushing via visuals such as legends or histograms, applying visual effects, modifying data selections, combinations thereof, or the like.

As such, embodiments of the concepts and technologies disclosed herein can be configured to support pausing of playback of a tour and interacting with the spreadsheet data 118 from the view shown in the tour at the time the tour is paused. As will be explained in more detail below, a user or other entity can interact with the view and select an option for saving the modified view, thereby modifying the tour and/or a scene of the tour. These and other aspects of interacting with the tour and/or a scene of the tour are illustrated and described in more detail below with reference to FIGS. 5A-5J.

From operation 406, the method 400 proceeds to operation 408, wherein the computer system 102 determines if playback of the tour has been resumed. Thus, the computer system 102 can be configured to determine, in operation 408, if a command for resuming the playback is received. In some embodiments, for example, the computer system 102 can determine that playback of the tour has been resumed in response to detecting selection of a play control.

Because the computer system 102 can determine that playback has been resumed in additional and/or alternative ways, it should be understood that this example is illustrative, and should not be construed as being limiting in any way.

If the computer system 102 determines, in operation 408, that playback of the tour has not been resumed, the method 400 can repeat operation 408. As such, it can be appreciated that the computer system 102 can be configured to repeat operation 408 until the computer system 102 determines, in any iteration of operation 408, that playback of the tour has been resumed. If the computer system 102 determines, in operation 408, that playback of the tour has been resumed, the method 400 proceeds to operation 410.

In operation 410, the computer system 102 can resume playback of the tour at the saved playback position. In particular, the computer system 102 can retrieve data identifying the playback position as saved in operation 406 from a data storage device, and resume playback of the tour at the saved position.

From operation 410, the method 400 can proceed to operation 412. In operation 412, the computer system 102 can determine if any changes to the tour have been made. For example, the computer system 102 can determine if the tour and/or a scene of the tour has been modified during a pause in playback, after the pause, after playback completes, or the like. As such, the computer system 102 can be configured to save changes to the tour and/or scenes of the tour that are made during playback of the tour.

If the computer system 102 determines, in operation 412, that changes have been made to the tour, the method 400 can proceed to operation 414. In operation 414, the computer system 102 can save the tour. It should be understood that saving the tour in operation 414 can be substantially similar, or even identical, to saving the tour as described above with reference to operation 310 of FIG. 3, though this is not necessarily the case.

From operation 414, the method proceeds to operation 416. The method 400 also can proceed to operation 416 from operation 412, if the computer system 102 determines, in operation 412, that changes have not been made to the tour. The method 400 ends at operation 416.

Figure 5A:
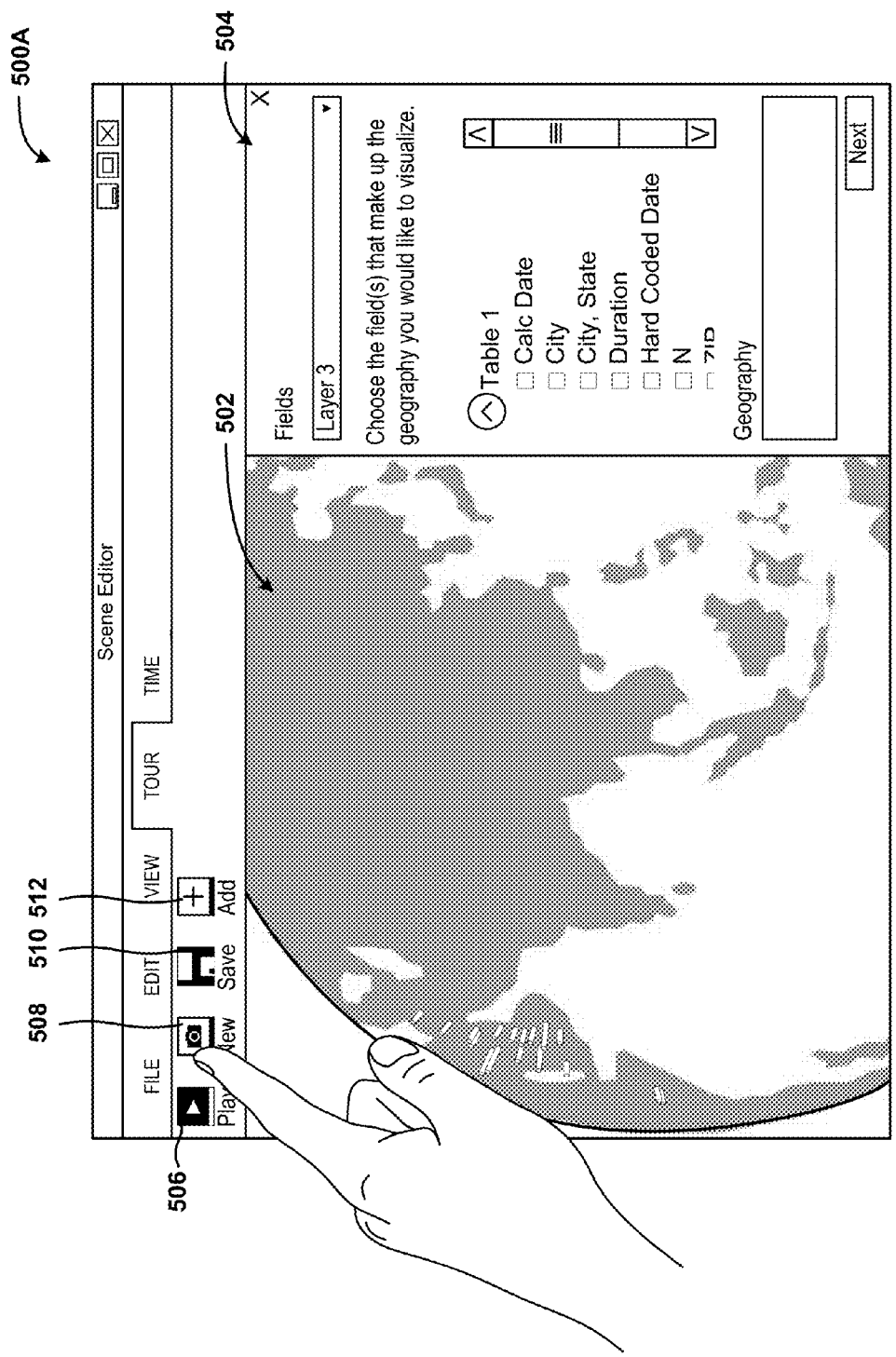
FIGS. 5A-5J are user interface diagrams showing aspects of user interfaces for generating scenes and tours in a spreadsheet application, according to various illustrative embodiments.

Turning now to FIGS. 5A-5J, UI diagrams showing various aspects of the concepts and technologies disclosed herein for generating scenes and tours in a spreadsheet application will be described according to various illustrative embodiments. FIG. 5A shows an illustrative screen display 500A generated by a device such as the computer system 102 and/or the user computing device 112. In some embodiments, the screen display 500A can correspond to the UI 114 displayed by the user computing device 112, as shown in FIG. 1, though this is not necessarily the case. It should be appreciated that the UI diagram illustrated in FIG. 5A is illustrative of one contemplated example, and therefore should not be construed as being limited in any way.

As shown in FIG. 5A, the screen display 500A can include a view 502 corresponding to a three-dimensional visualization of data such as the spreadsheet data 118 described herein. More particularly, the view 502 is illustrated as a map with multiple columns corresponding to data associated with the respective geographic locations included in the spreadsheet data 118. It should be understood that the example view 502 shown in FIG. 5A is illustrative and therefore should not be construed as being limiting in any way.

The screen display 500A also can include a display properties bar 504 for selecting and/or deselecting fields of data that are to be considered or represented in generating and/or displaying the view 502. The fields can be populated based upon the spreadsheet data 118 used to generate the view 502, though this is not necessarily the case. Via the display properties bar 504, fields can be selected and/or deselected to alter the view 502.

Additionally, the screen display 500A can include a play UI control 506 for playing a tour. As shown in FIG. 5A, the play UI control 506 can be shaded out or otherwise modified to indicate that a tour has not yet been created and/or cannot be played. In some embodiments, the computer system 102 can be configured to shade out and/or otherwise modify the play UI control 506 until a tour is created and/or at least one scene is added to a tour. It should be understood that this example is illustrative, and should not be construed as being limiting in any way.

The screen display 500A also includes a new UI control 508 for creating a new tour. Selection of the new UI control 508 can cause the computer system 102 to create a new tour, as will be explained in more detail below. It can be appreciated that selection of the new UI control 508 can correspond, in some embodiments, to detecting creation of a tour as described above with reference to operation 304 of FIG. 3. It should be understood that this embodiment is illustrative, and should not be construed as being limiting in any way.

The screen display 500A also includes a save UI control 510 for saving a tour. Selection of the save UI control 510 can cause the computer system 102 to save a tour. It can be appreciated that selection of the save UI control 510 can cause the computer system 102 to save data corresponding to the tour, as described above with reference to operation 310 of FIG. 3, though this not necessarily the case. The screen display 500A also can include an add UI control 512 for adding a scene to a tour. Thus, while not shown in FIG. 5A, the add UI control 512 can be located in a scene menu and the play UI control 506, the new UI control 508, and/or the save UI control 510 can be located in a tour menu. It should be understood that this embodiment is illustrative, and should not be construed as being limiting in any way.

Figure 5B:
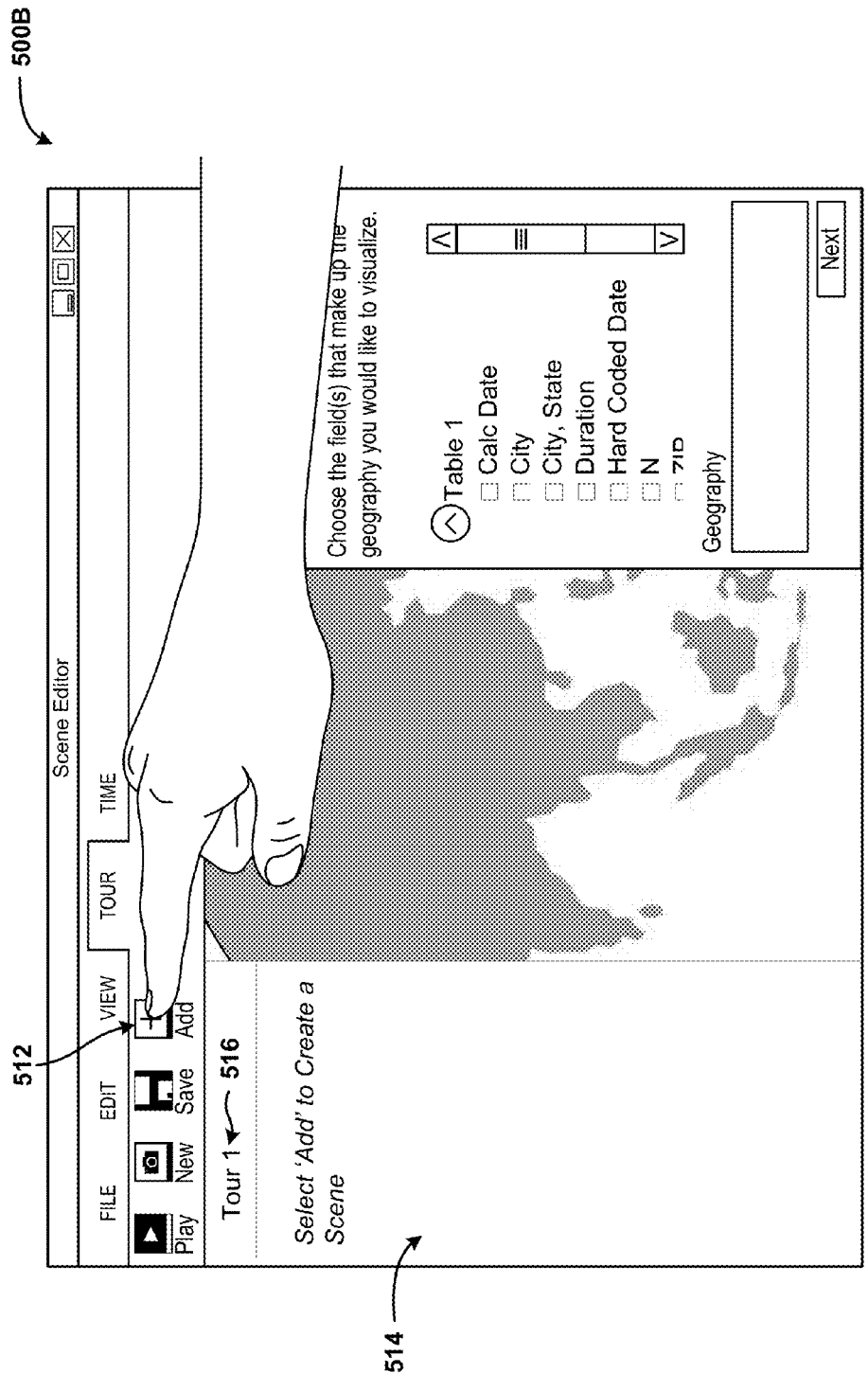

Turning now to FIG. 5B, a UI diagram showing additional aspects of the concepts and technologies disclosed herein for generating scenes and tours in a spreadsheet application is described in detail. In particular, FIG. 5B shows a screen display 500B generated by a device such as the computer system 102 and/or the user computing device 112. In some embodiments, the screen display 500B corresponds to one or more of the UIs 114 shown in FIG. 1 and described above with reference to FIGS. 1-5A. Furthermore, the screen display 500B can be presented, in some embodiments, in response to detecting selection of the new UI control 508 illustrated in FIG. 5A. Because the screen display 500B can be shown at additional and/or alternative times, it should be appreciated that this example, as well as the layout and/or contents of the UI diagram illustrated in FIG. 5B are illustrative and should not be construed as being limited in any way.

As shown in FIG. 5B, the computer system 102 can be configured to generate a tour explorer window 514 when a tour is created. The tour explorer window 514 can include a caption 516 showing a name of the tour. It should be understood that the illustrated caption 516 is illustrative. In some embodiments, the caption 516 can be automatically generated, for example by the computer system 102. Although not visible in FIG. 5B, the caption 516 can be editable in place. In one contemplated embodiment, the caption 516 can be selected and interacted with to set and/or change the name of the tour. In the illustrated embodiment shown in FIG. 5B, the add UI control 512 is being selected. As explained above, selection of the add UI control 512 can cause the computer system 102 to add a scene to the tour. It should be understood that this embodiment is illustrative, and should not be construed as being limiting in any way.

Figure 5C:
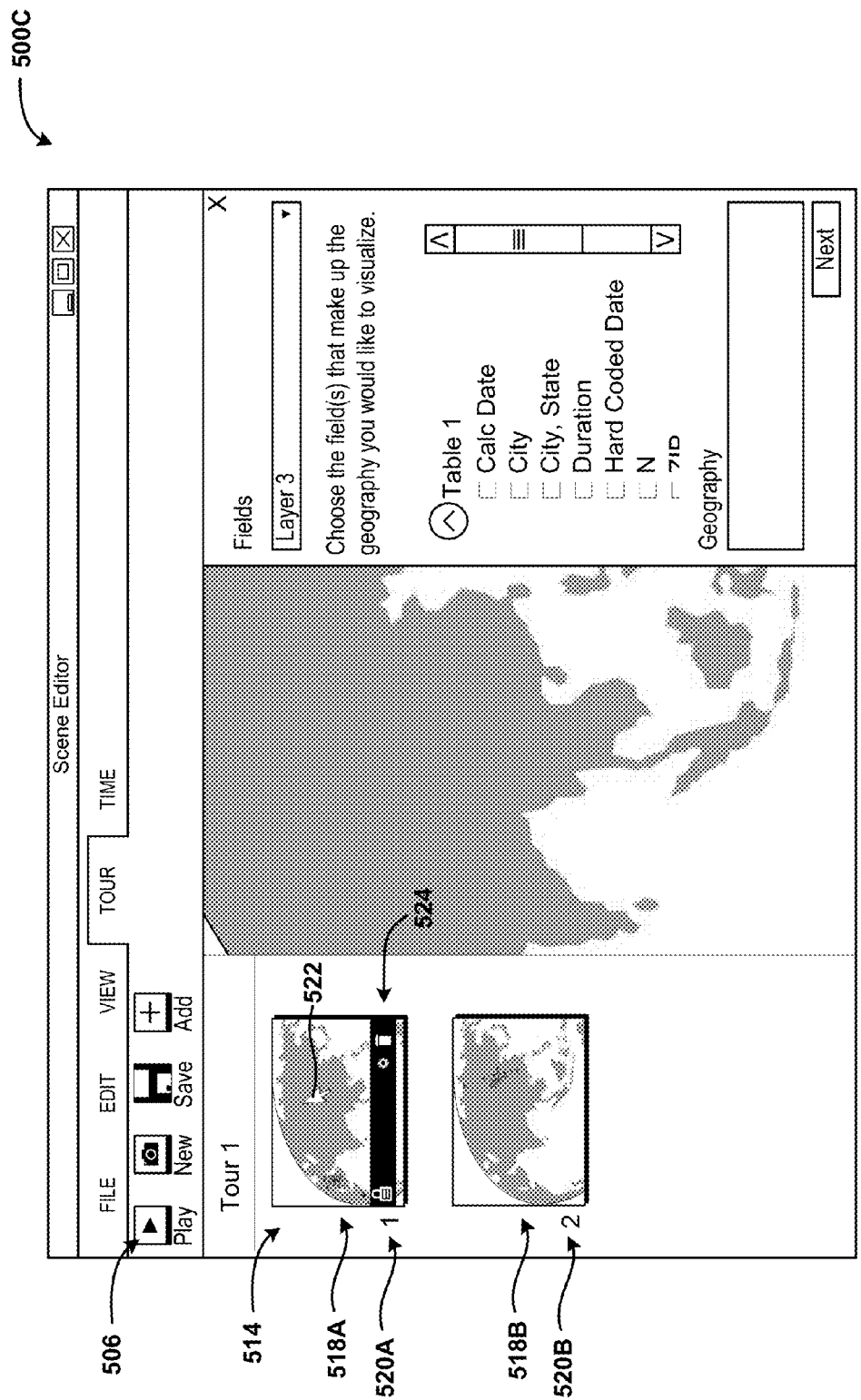

Turning now to FIG. 5C, a UI diagram showing additional aspects of the concepts and technologies disclosed herein for generating scenes and tours in a spreadsheet application is described in detail. In particular, FIG. 5C shows a screen display 500C generated by a device such as the computer system 102 and/or the user computing device 112. In some embodiments, the screen display 500C corresponds to one or more of the UIs 114 shown in FIG. 1 and described above with reference to FIGS. 1-5B. In some instances, the screen display 500C can be presented in response to detecting selection of the add UI control 512 illustrated in FIG. 5B. Because the screen display 500C can be shown at additional and/or alternative times, it should be appreciated that this example, as well as the layout and/or contents of the UI diagram illustrated in FIG. 5C are illustrative and should not be construed as being limited in any way.

In FIG. 5C, the tour explorer window 514 displays two thumbnails 518A-B (hereinafter collectively and/or generically referred to as "thumbnails 518"). The thumbnails 518 can represent and/or correspond to scenes included in the tour. As shown in FIG. 5C, the thumbnails 518 can include respective thumbnail captions 520A-B (hereinafter collectively and/or generically referred to as "thumbnail captions 520"). The thumbnail captions 520 can display a name of the scenes associated with the thumbnails 518, and as with the caption 516 discussed above with reference to FIG. 5B, the thumbnail captions 520 can be editable in place via selection and editing, among other manners.

According to some embodiments of the concepts and technologies disclosed herein, the thumbnails 518 also can include other functionality for interacting with and/or controlling various aspects of the tour. As shown in FIG. 5C, a mouse pointer 522 has been placed over (or "hovered" over) the thumbnail 518A. In response to detecting this position of the mouse pointer 522, the computer system 102 can be configured to generate and/or display a scene menu 524. The scene menu 524 can include various options such as, for example, an option to delete the scene, an option to lock the scene, an option to access settings and/or properties associated with the scene corresponding to the thumbnail 518A, other options, combinations thereof, or the like. The option to lock the scene can be used to require unlocking before the scene associated with the thumbnail 518 can be edited to prevent unwanted or unintended changes. If a user or other entity tries to edit a locked scene, the computer system 102 can display a notification to create a new scene or take other actions. Because additional and/or alternative options can be included in the scene menu 524, it should be understood that this embodiment is illustrative, and should not be construed as being limiting in any way.

It also can be appreciated with reference to FIG. 5C that the play UI control 506 has been unshaded or otherwise modified to indicate that this control is activated. Thus, the computer system 102 can be configured to enable playback of the tour in response to detecting that the tour includes at least one scene. Because this feature is optional, it should be understood that this embodiment is illustrative, and should not be construed as being limiting in any way.

Figure 5D:
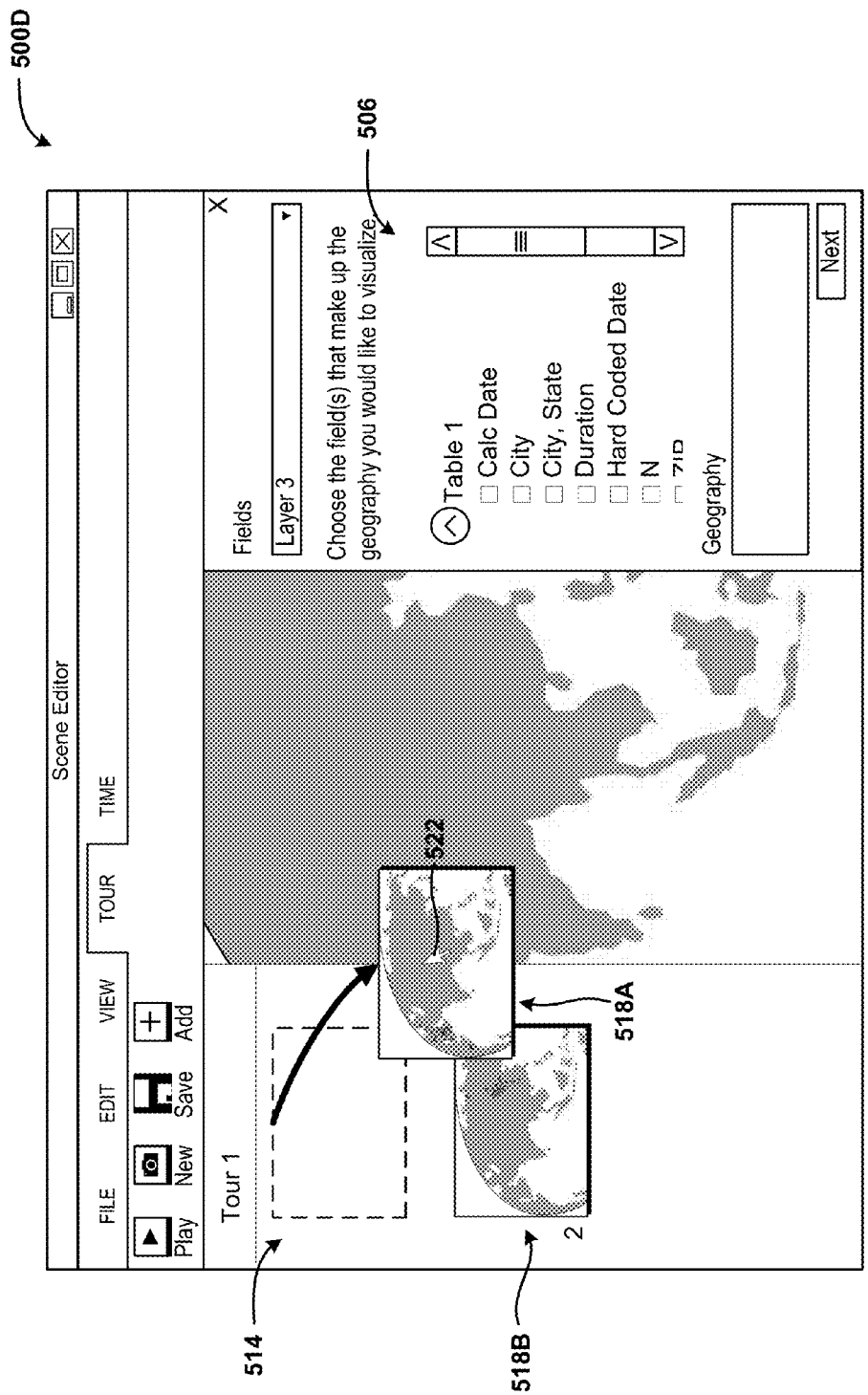

Turning now to FIG. 5D, a UI diagram showing additional aspects of the concepts and technologies disclosed herein for generating scenes and tours in a spreadsheet application is described in detail. In particular, FIG. 5D shows a screen display 500D generated by a device such as the computer system 102 and/or the user computing device 112. In some embodiments, the screen display 500D corresponds to one or more of the UIs 114 shown in FIG. 1 and described above with reference to FIGS. 1-5C. It should be appreciated that the UI diagram illustrated in FIG. 5D is illustrative of one contemplated embodiment, and therefore should not be construed as being limited in any way.

In FIG. 5D, the tour explorer window 514 is again illustrated as being displayed. In FIG. 5D, however, the thumbnail 518A has been dragged out of a position at which it was illustrated in FIG. 5C. For example, a user or other entity may drag the thumbnail 518A by clicking a mouse button while the mouse pointer 522 is located on the thumbnail 518A, holding down the mouse button, and moving the mouse pointer 522 while holding the mouse button. It should be understood that this example is illustrative, and that various touch and/or multi-touch gestures can be used to indicate a similar or identical command. For example, a touch-and-drag gesture, a two fingered touch-and-drag gesture, and/or other touch and/or multi-touch gestures may be used to drag the thumbnail 518A as shown in FIG. 5D.

Figure 5E:
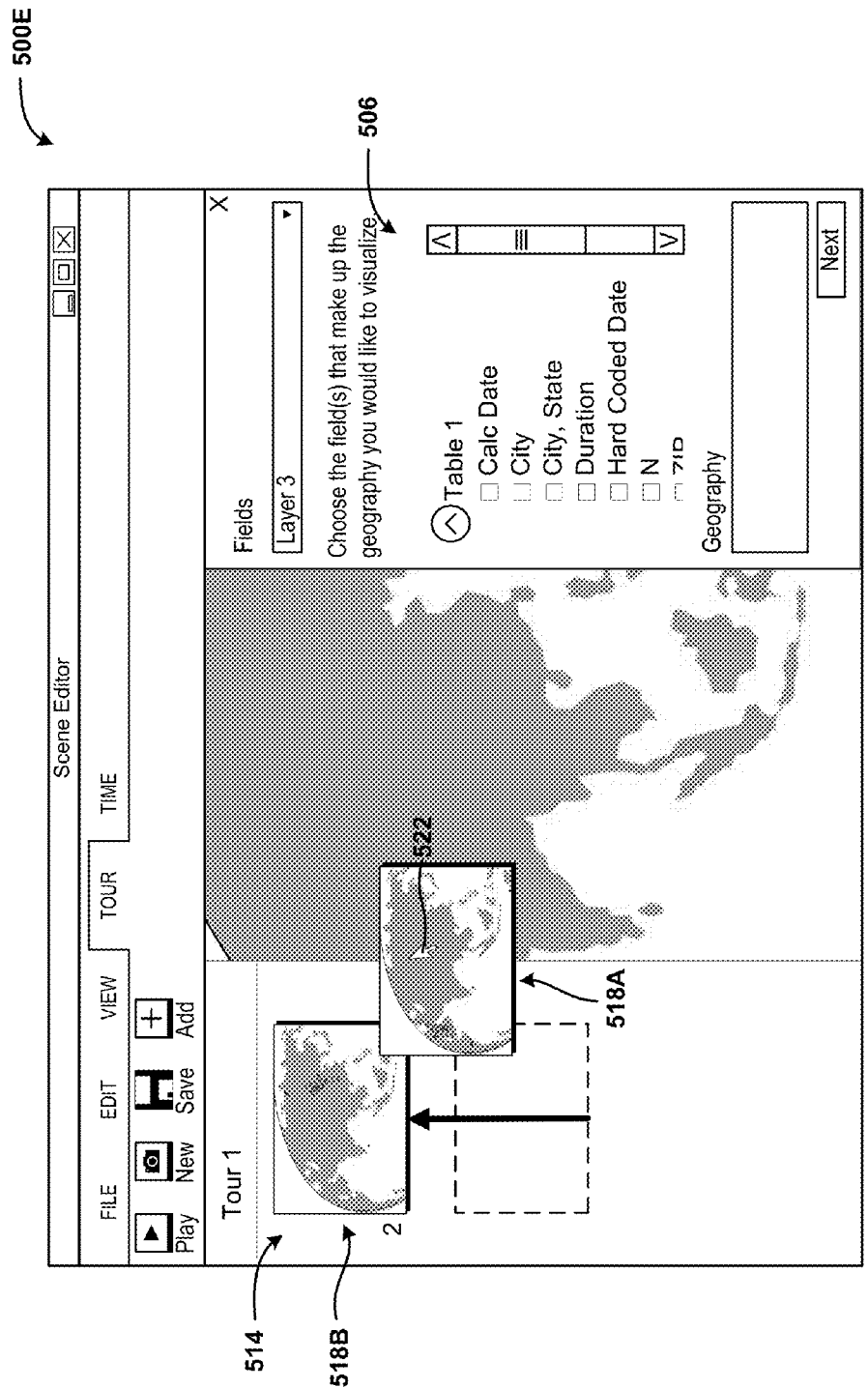
Figure 5F:
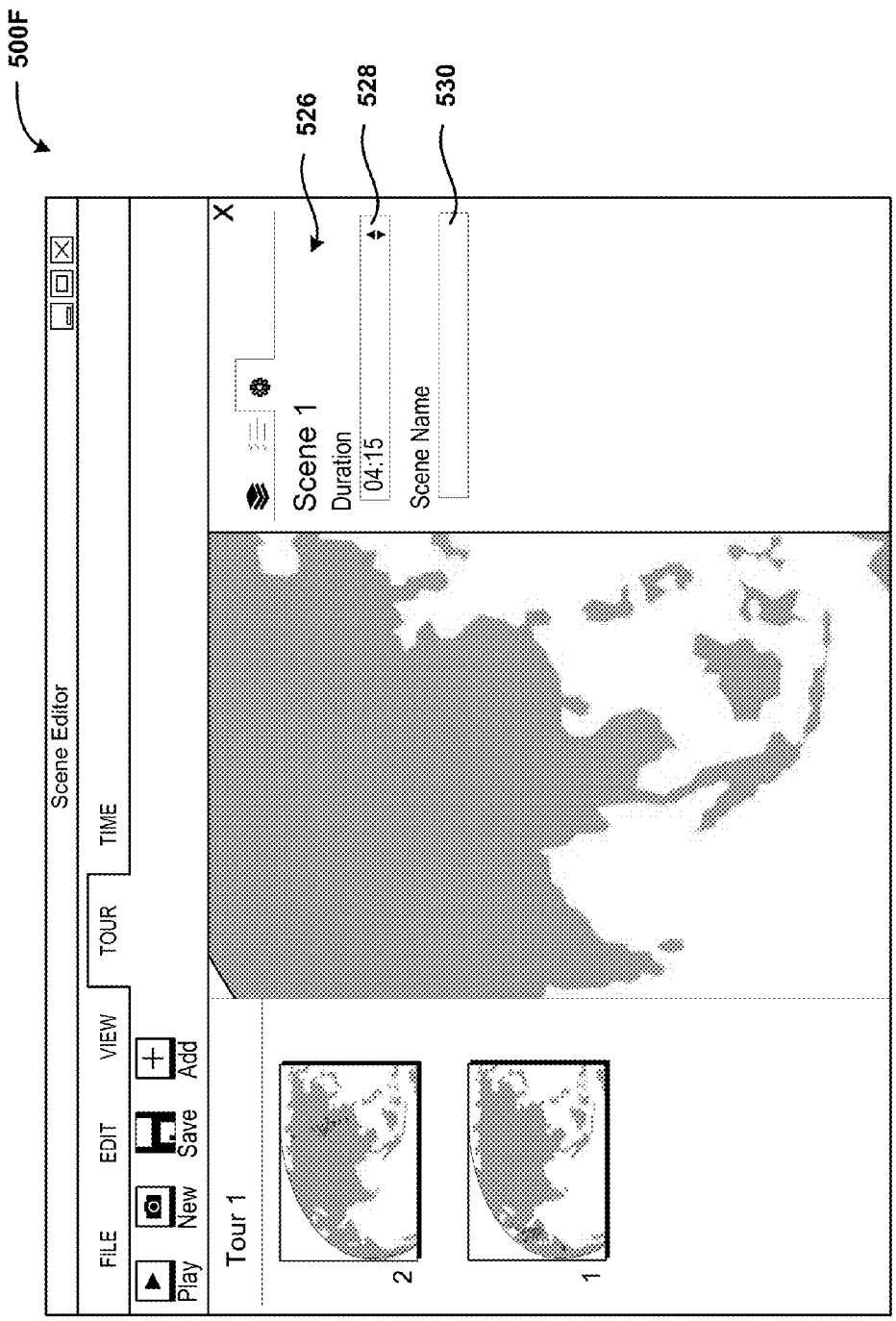

In response to detecting dragging of the thumbnail 518A, the computer system 102 can shift the thumbnail 518B to the position formerly occupied by the thumbnail 518A, as shown in FIG. 5E. After the mouse button is released, the finger or fingers are brought out of contact with a touch or multi-touch screen, and/or another type of input is detected by the computer system 102, the computer system 102 can locate the thumbnail 518A in the position formerly occupied by the thumbnail 518B, as shown in FIG. 5F. Thus, it can be appreciated by collectively referring to FIGS. 5D-5F that scenes can be reordered in the user interfaces 114, if desired.

FIG. 5F also shows additional aspects of the concepts and technologies disclosed herein for generating scenes and tours in a spreadsheet application is described in detail. In particular, FIG. 5F shows a screen display 500F generated by a device such as the computer system 102 and/or the user computing device 112. It should be appreciated that the UI diagram illustrated in FIG. 5F is illustrative of one contemplated embodiment, and therefore should not be construed as being limited in any way.

In FIG. 5F, a scene properties window 526 is illustrated as being displayed. Then scene properties window 526 can be displayed, for example, in response to detecting selection of a settings or properties option as shown in the scene menu 524 illustrated in FIG. 5D. Because the scene properties window 526 can be shown at additional and/or alternative times, it should be understood that this embodiment is illustrative, and should not be construed as being limiting in any way. The scene properties window 526 can include an option 528 for setting a duration of the scene, as well as a field 530 for entering a scene name. It can be appreciated that by entering a name into the field 530 can cause the computer system 102 to display the name entered in the field 530 as one of the captions 520 illustrated in FIG. 5D, though this is not necessarily the case.

Figure 5G:
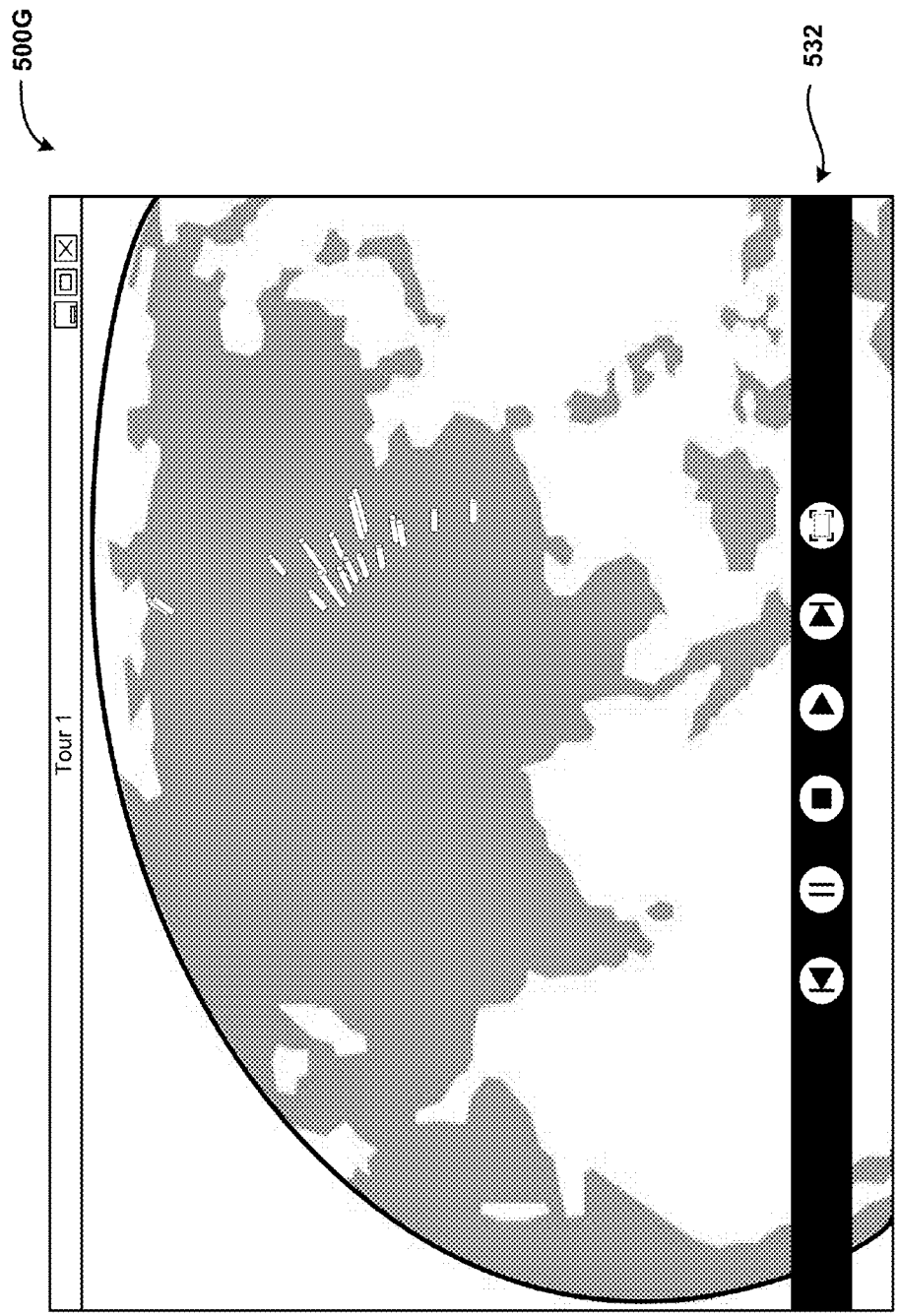

Turning now to FIG. 5G, a UI diagram showing additional aspects of the concepts and technologies disclosed herein for generating scenes and tours in a spreadsheet application is described in detail. It should be appreciated that the UI diagram illustrated in FIG. 5G is illustrative of one contemplated embodiment, and therefore should not be construed as being limited in any way. In FIG. 5G, playback of the tour is illustrated according to an illustrative embodiment. As shown in FIG. 5G, the tour can be shown as a full screen representation of the tour. In FIG. 5G, playback controls 532 are shown. According to various embodiments, the playback controls 532 can be shown in the playback screen in response to detecting hovering and/or other interactions with the screen display 500G, and hidden or animated away in response to detecting the end of a command, passage of a time limit without no interactions, combinations thereof, or the like. Thus, it can be appreciated that the playback controls 532 can be hidden from view, though this is not necessarily the case.

It should be understood that the various elements shown in the FIGS. 5A-5J can be changed, moved, resized, hidden from view, and/or presented in additional or alternative formats, layouts, relative sizes, or the like. For example, the screen displays 500 can display controls for labeling or numbering scenes. Additionally, the thumbnails 518 can provide miniature animated versions of the scenes to which they correspond to provide previews of the scenes. Scene visuals may resize according to the width of the displayed panel, as shown in the FIGURES, and scenes may indicate whether or not the scenes include temporal information. Additionally, the screen displays 500 can include menu options or controls for choosing transitions, choosing effects, choosing durations, choosing time persistence and/or decay, and/or setting other time properties of the scenes and/or tour. It should be understood that these embodiments are illustrative, and should not be construed as being limiting in any way.

Figure 5H:
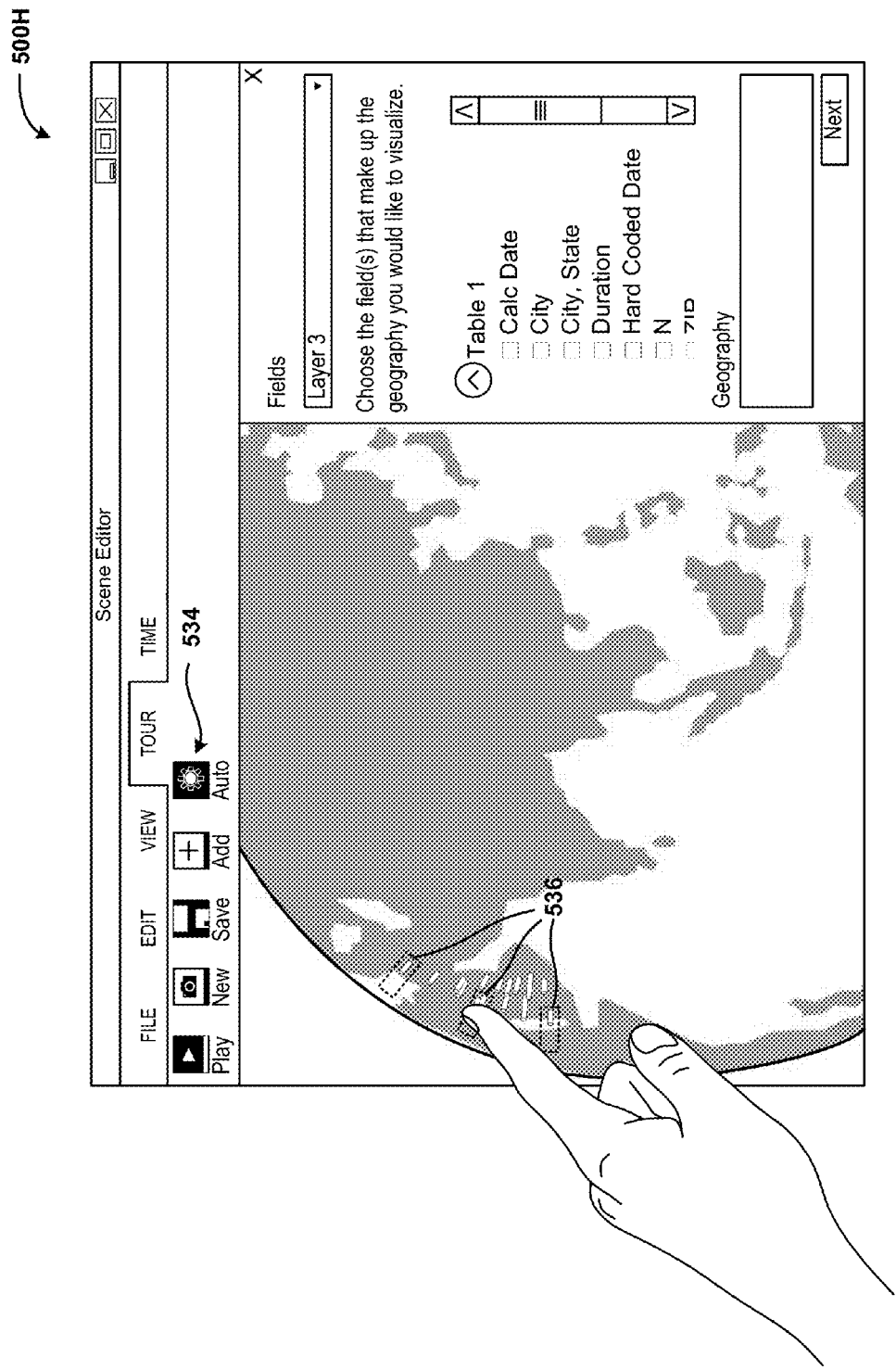

FIG. 5H also shows additional aspects of the concepts and technologies disclosed herein for generating scenes and tours in a spreadsheet application is described in detail. In particular, FIG. 5H shows a screen display 500H generated by a device such as the computer system 102 and/or the user computing device 112. It should be appreciated that the UI diagram illustrated in FIG. 5H is illustrative of one contemplated embodiment, and therefore should not be construed as being limited in any way.

In FIG. 5H, an auto tour UI control 534 is shown. According to various implementations of the concepts and technologies disclosed herein, selection of the auto tour UI control 534 can cause the computer system 102 to generate an auto tour as described above with reference to FIG. 3. As such, selection of the auto tour UI control 534 can cause the computer system 102 to analyze the spreadsheet data 118 or other data used to generate a visualization to generate one or more scenes and/or generate a tour that includes the one or more scenes without user input.

Thus, as will be illustrated and described below with reference to FIG. 5I, the computer system 102 can generate one or more scenes that can be automatically generated by the computer system 102 according to various considerations such as, for example, identification of fastest growing data or data sets, fastest shrinking data or data sets, data or data sets having a widest distribution or variation among the data points and/or over a time range or window, data or data sets having the largest values, data or data sets having the smallest values, data or data sets having a widest or narrowest variation over geographic locations, combinations thereof, or the like.

In some other embodiments, as shown in FIG. 5H, the computer system 102 can be configured to generate an auto tour based upon user input. As shown in FIG. 5H, a user can select one or more data points, data sets, or the like. In FIG. 5H, this is illustrated by highlighting of the data or data sets by bounding boxes 536, which the computer system 102 can be configured to draw around the selected data or data points. In some other embodiments, the computer system 102 can generate tours based upon selection of a data set or location. Selection also can be used to show the selected data points in the tour (e.g., to apply a filter for those data points) and/or to color the selected points (e.g., as an exception format). Selection also can be used to add an annotation to the selected data points, set, or group. It should be understood that these embodiment are illustrative, and should not be construed as being limiting in any way.

The selected data can be highlighted as shown, and upon detecting a selection of the auto tour UI control 534, the computer system 102 can generate a tour that has scenes directed to the selected data and/or associated data sets. Thus, for example, the computer system 102 can be configured to generate a scene for each of the selected data points or data sets and create a tour with those scenes. Because the scenes can be generated in additional and/or alternative ways, it should be understood that this embodiment is illustrative, and should not be construed as being limiting in any way.

Figure 5I:
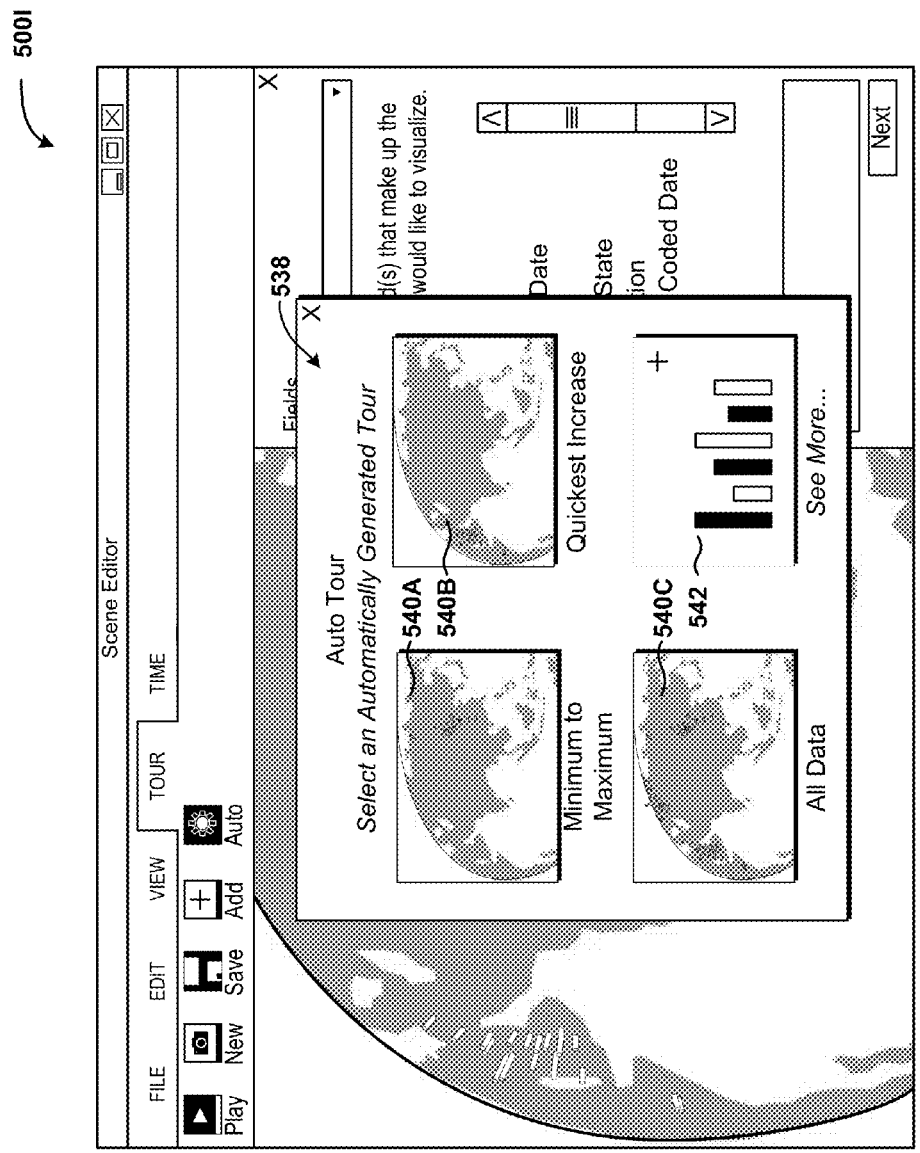

Turning to FIG. 5I, additional aspects of the concepts and technologies disclosed herein for generating auto tours and/or scenes of auto tours in a spreadsheet application are described in detail. In particular, FIG. 5I shows a screen display 500I generated by a device such as the computer system 102 and/or the user computing device 112. The screen display 500I can be, but is not necessarily, generated by the computer system 102 in response to detecting selection of the auto tour UI control 534 illustrated and described above with reference to FIG. 500H. Because the screen display 500I can be generated by the computer system 102 at additional and/or alternative times, and because the contents of the screen display 500I can be varied in a variety of manners, it should be understood that the UI diagram illustrated in FIG. 5I is illustrative of one contemplated example, and therefore should not be construed as being limited in any way.

In FIG. 5I, an auto tour selection window 538 is shown. According to various implementations of the concepts and technologies disclosed herein, the auto tour selection window 538 can present one or more auto tour suggestion icons 540A-C (hereinafter collectively and/or generically referred to as "auto tour suggestion icons 540"). The auto tour suggestion icons 540 can illustrate suggested or available scenes that have been identified by the computer system 102 based upon the spreadsheet data 118. The types of tours and/or scenes that are referenced by the auto tour suggestion icons 540 can be specified by program settings, user settings, analysis of the spreadsheet data 118, combinations thereof, or the like. As such, the example tours or scenes shown in FIG. 5I should be understood as being illustrative and should not be construed as being limiting in any way.

Selection of the auto tour suggestion icons 540 can cause the computer system 102 to generate an auto tour as described above with reference to FIG. 3 and/or to create a scene for adding to a tour. As such, selection of one of the auto tour suggestion icons 540 can cause the computer system 102 to generate a scene and/or to generate a tour with one or more scenes. The auto tour selection window 538 also can include a UI control 542 for accessing or viewing additional auto tour or auto scene options. Thus, for example, selection of the UI control 542 can cause the computer system 102 to present additional and/or alternative auto tour suggestion icons 540. It should be understood that this embodiment is illustrative, and should not be construed as being limiting in any way.

Thus, it can be appreciated that selection of one or more of the auto tour suggestion icons 540 can cause the computer system 102 to generate an auto tour. Thus, a user may generate a tour, add scenes to the tour, and/or organize the scenes of the tour (as described herein with reference to FIGS. 3-5G), by selecting the auto tour UI control 534 illustrated and described in FIG. 5H. It should be understood that this embodiment is illustrative, and should not be construed as being limiting in any way.

Figure 5J:
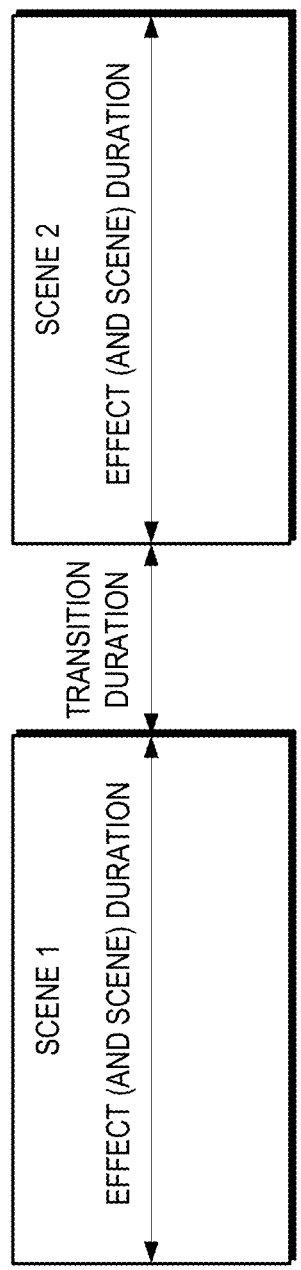

Turning to FIG. 5J, additional aspects of the concepts and technologies disclosed herein for transitions and effects of auto tours in a spreadsheet application are described in detail. In particular, FIG. 5J shows "Scene 1" and "Scene 2". As described above, a transition having a duration occurs between "Scene 1" and "Scene 2". Some examples of transitions include, but are not limited to, a cut transition and an arc transition. A cut transition displays a scene and then switches to a new scene within one frame. The camera doesn't move along a path, but rather, the camera appears instantly at the new location, i.e. the transition's duration is essentially zero. In some implementations, cut transition are automatically applied to the first scene in the tour. In the first scene, all transition options may be disabled. If a scene is moved to the first position by a user or as a result of deleting data, the scene's transition may be reset to cut. If the first scene is moved to a different position then it is assigned the default transition parameters.

An arc transition has a visual appearance that appears to simulate the flight path of an aircraft flying from airport to airport (or from Point A to Point B). The camera and its look-at target ease-out of their last positions in the source location, while the camera increases its elevation to a specified height and the look-at target moves along the ground. At the midpoint of the arc, the camera begins to descend again and ease into the new scene position. The longer the flight path the steeper the arc. The height of arc may be generated automatically. In some implementations, the transition calculates the height of its arc trajectory based on distance. In further implementations, the transition calculates the speed with which the camera moves based on the duration.

The arc transition can begin and end ease-in turns which are not affected by changes in duration. The turns which precede the transition may also be calculated automatically depending where the next scene is located. The turns for the transition may change depending on the type of effect as well as the duration of the scene. Calculations may be performed done to optimize the turns as well as the transition for the least amount of turning and for keeping the next target in view. A target is the center view point at which the scene is captured. The target of a scene is typically in the middle and it is anchored using geographical coordinates.

While a transition may be used between scenes, an effect may be used within a scene itself. Some examples of effects include, but are not limited to, "still," "orbit," "fly-by," "figure 8 idle," "fly-over" and "push-in." In a still effect, the camera stays still for the duration of the scene, or, if the duration is 0, then all the camera parameters can be smoothly interpolated through the scene as if it is a key frame. As used herein, a "key frame" is a drawing that defines the starting and end points of any smooth transition or effect. An orbit is a circular path placed above the data at the elevation at which the user captured the scene. The radius of the orbit can be calculated depending on the distance of the target scene.

In a fly-by, the camera moves along a perpendicular path to a look-at vector. The camera is pointed directly at the target. The distance traveled is depending on the distance at which the scene was captured as well as the duration of the scene and the speed chosen by the user. The middle of the line is the same point at which the user captured the scene. In a figure 8 idle, the camera moves around same spot in a "figure 8" movement. In a fly-over, the camera flies directly over the center of a target. The camera is pointed such that the target is in view at the start of the flight effect and it flies right over it towards the end of the scene. The camera looks down at an angle towards the target. In a push-in, the camera travels directly towards the center of the scene target. It stops at a predetermined distance from the target. The stop is the end of the scene.

Although not shown in the UI diagrams illustrated and described above with reference to FIGS. 5A-5J, some embodiments of the concepts and technologies disclosed herein include a UI control for exporting a tour. The tour can be exported as a tour file, a video file, an audio/video presentation, and/or other formats. In some embodiments, the tour can be exported as a video file that can be played on any device capable of audio and/or video playback. The tour also can be exported as other types of files and/or to other types of programs such as slide show presentation programs, movie editor programs, image editing programs, other programs, or the like. The tour also can be exported as a web page or web page element, in some embodiments. As such, it can be appreciated that the tours can be played continuously and/or may pause at the end of a scene until user input for proceeding to a next scene is received or detected by the computer system 102. The user interfaces also can support selection and/or placement of an audio track in the tour. The audio track can correspond, for example, to music, spoken words explaining the data shown, other audio, combinations thereof, or the like. As such, it should be understood that operations 310 and/or 414 of the methods 300, 400 discussed above can correspond to exporting the tour as a video file. It should be understood that these embodiments are illustrative, and should not be construed as being limiting in any way.

Although not illustrated in FIGS. 5A-5J, it should be understood that that the scenes and/or tours also can include two-dimensional images. Thus, for example, a scene or tour can include text, title pages, credits, images, logos, other information, combinations thereof, or the like. The scenes and/or tours also can include links, for example, links to other scenes, tours, or document locations.

In some embodiments of the concepts and technologies disclosed herein, the visualization component 110 can be configured to apply themes to tours. Thus, transitions, effects, animation speed, audio accompaniment, combinations thereof, or the like can be applied to scenes and/or tours by the visualization component 110. Thus, the viewing angles, transitions, data formats, and/or other aspects of a scene can be set by a template or theme and/or applied to a tour or scene by the visualization component 110. It should be understood that this embodiment is illustrative, and should not be construed as being limiting in any way.

While the above description of scenes and tours refers to various animations and/or animation effects, it should be understood that the tours and/or scenes of the tours need not be animated. In particular, some embodiments of the concepts and technologies described herein can be used to provide a tour that begins with a first location and cuts to a second location without animation. As such, it should be understood that the above example embodiments are illustrative and should not be construed as being limiting in any way.

Figure 6:
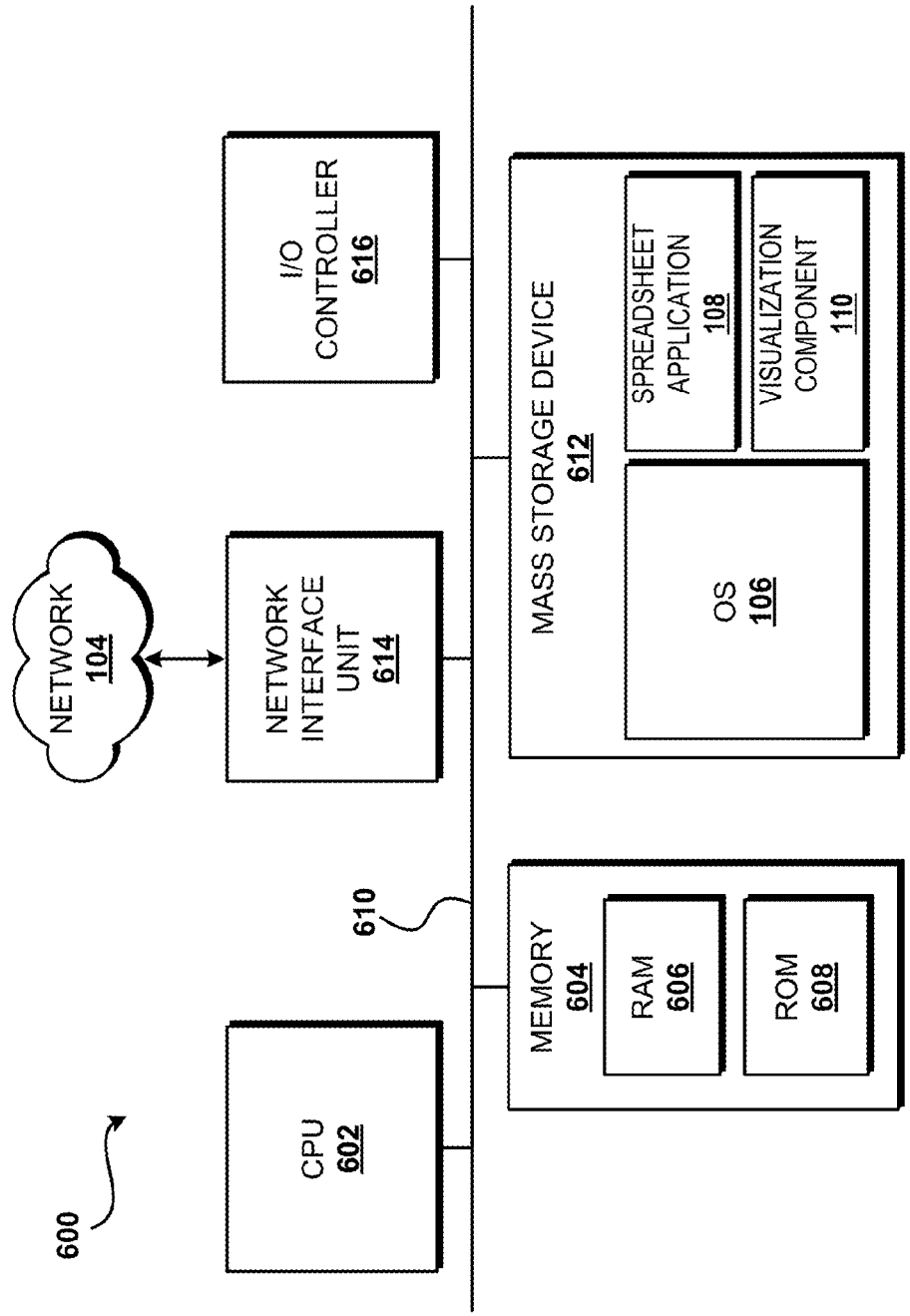
FIG. 6 is a computer architecture diagram illustrating an illustrative computer hardware and software architecture for a computing system capable of implementing aspects of the embodiments presented herein.

FIG. 6 illustrates an illustrative computer architecture 600 for a device capable of executing the software components described herein for generating scenes and tours in a spreadsheet application. Thus, the computer architecture 600 illustrated in FIG. 6 illustrates an architecture for a server computer, mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing the operating system 106 and one or more application programs including, but not limited to, the spreadsheet application 108, the visualization component 110, other application programs, or the like. Although not shown in FIG. 6, the mass storage device 612 also can be configured to store the spreadsheet data 118, the geographic mapping data 124, the map data 126, and/or graphical data corresponding to one or more of the UIs 114 described herein, if desired.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture 600. For purposes of the claims, the phrase "computer storage medium," and variations thereof, does not include waves or signals per se and/or communication media.

According to various embodiments, the computer architecture 600 may operate in a networked environment using logical connections to remote computers through a network such as the network 104. The computer architecture 600 may connect to the network 104 through a network interface unit 614 connected to the bus 610. It should be appreciated that the network interface unit 614 also may be utilized to connect to other types of networks and remote computer systems such as, for example, the data source 120, the geocoding services 122, the map server 128, the user computing device 112, and/or other systems or devices. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
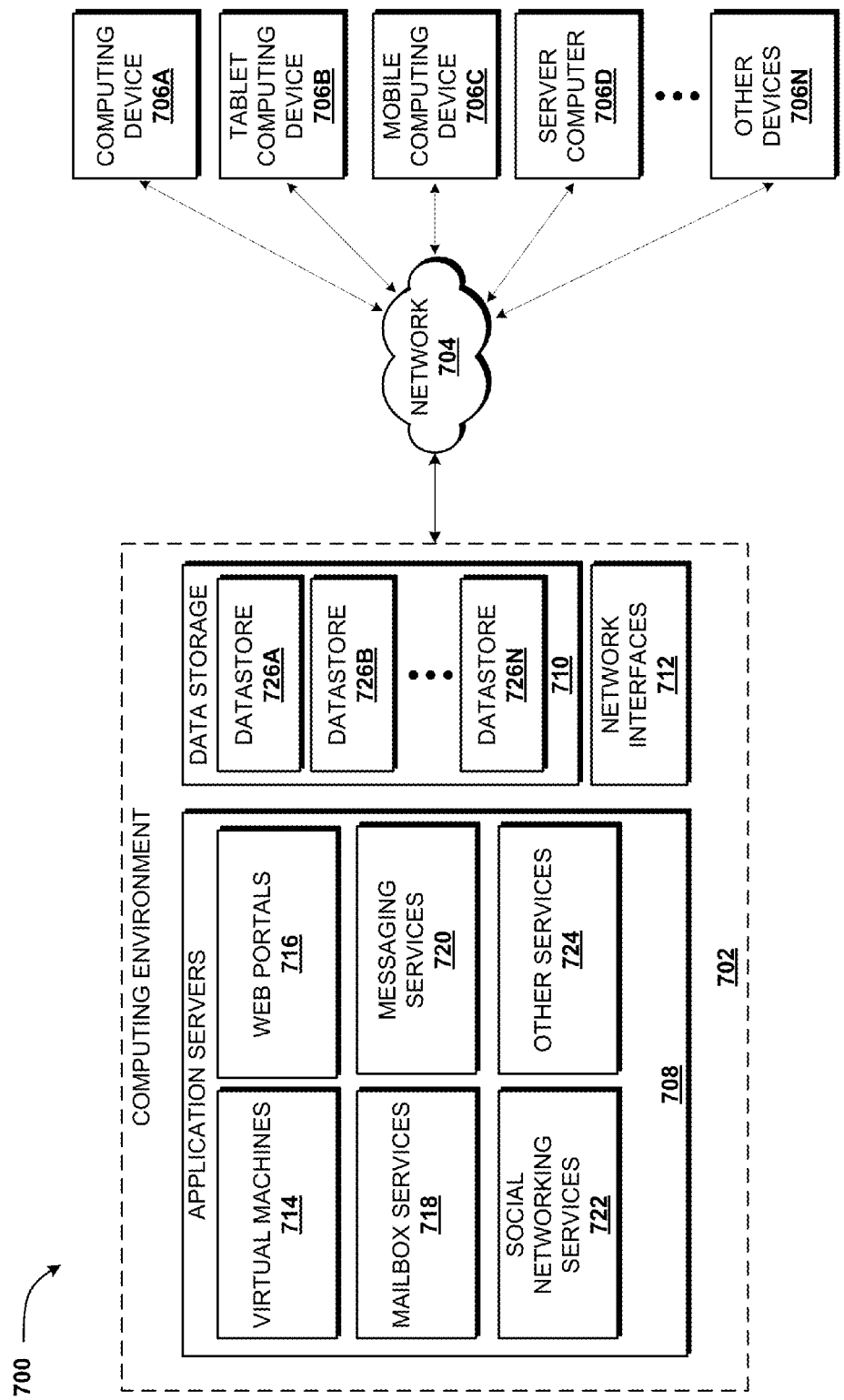
FIG. 7 is a diagram illustrating a distributed computing environment capable of implementing aspects of the embodiments presented herein.

FIG. 7 illustrates an illustrative distributed computing environment 700 capable of executing the software components described herein for generating scenes and tours in a spreadsheet application. Thus, the distributed computing environment 700 illustrated in FIG. 7 can be used to provide the functionality described herein with respect to the computer system 102. The distributed computing environment 700 thus may be utilized to execute any aspects of the software components presented herein.

According to various implementations, the distributed computing environment 700 includes a computing environment 702 operating on, in communication with, or as part of the network 704. The network 704 also can include various access networks. According to various implementations, the functionality of the network 704 can be provided by the network 104 illustrated in FIG. 1. One or more client devices 706A-706N (hereinafter referred to collectively and/or generically as "clients 706") can communicate with the computing environment 702 via the network 704 and/or other connections (not illustrated in FIG. 7). In the illustrated embodiment, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 6 and 8. It should be understood that the illustrated clients 706 and computing architectures illustrated and described herein are illustrative, and should not be construed as being limited in any way.

In the illustrated embodiment, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated embodiment, the application servers 708 host one or more virtual machines 714 for hosting applications or other functionality. According to various implementations, the virtual machines 714 host one or more applications and/or software modules for providing the functionality described herein for generating scenes and tours in a spreadsheet application. It should be understood that this embodiment is illustrative, and should not be construed as being limiting in any way. The application servers 708 also host or provide access to one or more Web portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") services including, but not limited to, calendar services, contact management services, collaboration services, and/or other services. The messaging services 720 can include, but are not limited to, instant messaging services, chat services, forum services, and/or other communication services.

The application servers 708 also can include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 722 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above embodiments are illustrative, and should not be construed as being limited in any way.

As shown in FIG. 7, the application servers 708 also can host other services, applications, portals, and/or other resources ("other resources") 724. The other resources 724 can include, but are not limited to, the geocoding services 122, the map server 128, the data source 120, and/or other services and/or resources. It thus can be appreciated that the computing environment 702 can provide integration of the concepts and technologies disclosed herein provided herein for generating scenes and tours in a spreadsheet application with various mailbox, messaging, social networking, and/or other services or resources. For example, the concepts and technologies disclosed herein can support sharing visualizations with social network users, mail recipients, message recipients or the like. Similarly, users or other entities can share visualizations and/or spreadsheet data 118 with social networking users, friends, connections, mail recipients, systems or devices, combinations thereof, or the like.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store the operating system 106, the spreadsheet application 108, the visualization component 110, graphics data corresponding to one or more UIs 114, the spreadsheet data 118, the geographic mapping data 124, the map data 126, combinations thereof, or the like.

The computing environment 702 can communicate with, or be accessed by, the network interfaces 712. The network interfaces 712 can include various types of network hardware and software for supporting communications between two or more computing devices including, but not limited to, the clients 706 and the application servers 708. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the clients 706. It should be understood that the clients 706 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 700 to utilize the functionality described herein for generating scenes and tours in a spreadsheet application.

Figure 8:
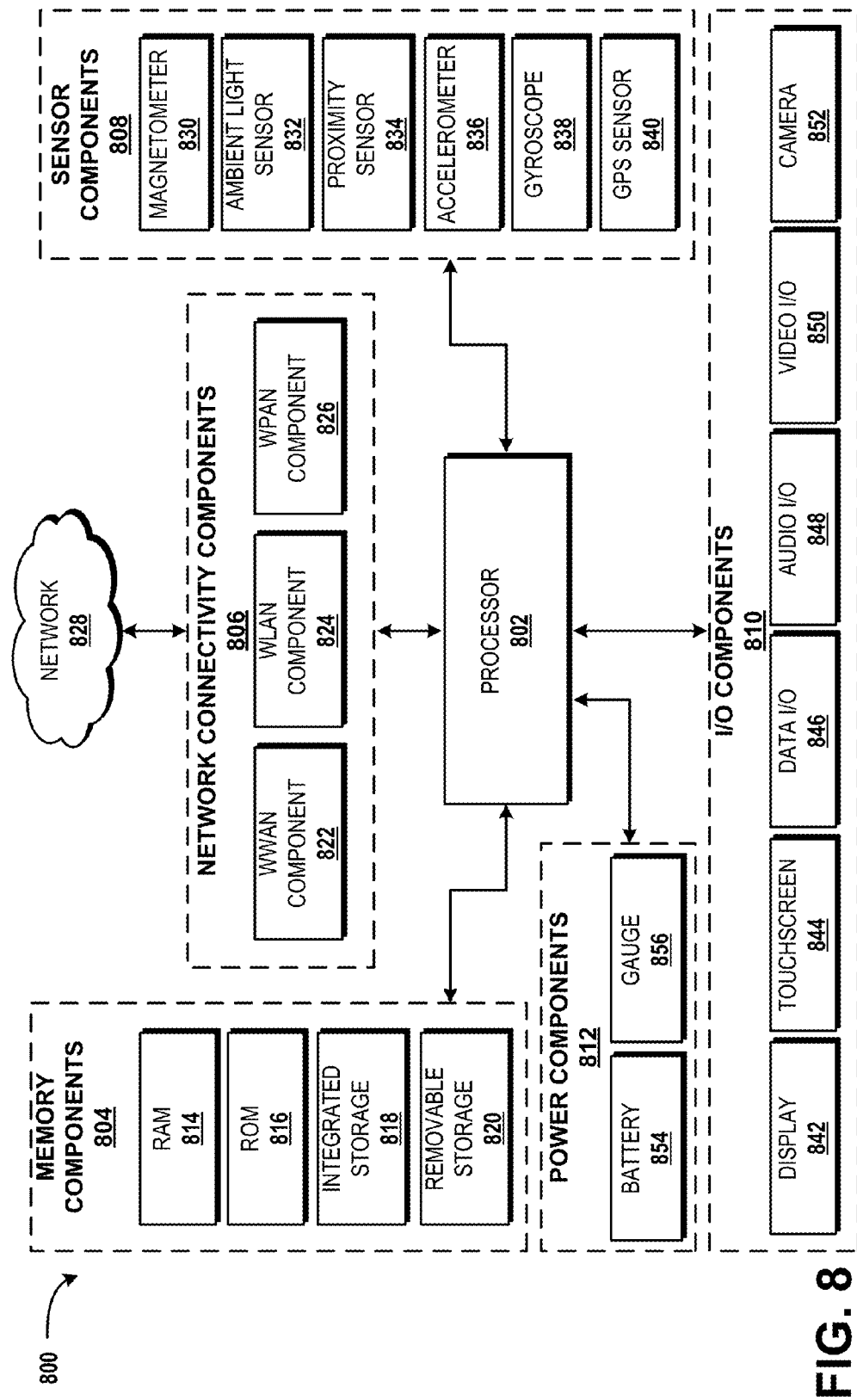
FIG. 8 is a computer architecture diagram illustrating a computing device architecture capable of implementing aspects of the embodiments presented herein.

Turning now to FIG. 8, an illustrative computing device architecture 800 for a computing device that is capable of executing various software components described herein for generating scenes and tours in a spreadsheet application. The computing device architecture 800 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 800 is applicable to any of the clients 806 shown in FIG. 7. Furthermore, aspects of the computing device architecture 800 may be applicable to traditional desktop computers, portable computers (e.g., laptops, notebooks, ultra-portables, and netbooks), server computers, and other computer systems, such as described herein with reference to FIG. 6. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated embodiment, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some embodiments, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some embodiments, the processor 802 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720p, 1080p, and greater), video games, three-dimensional modeling applications, and the like. In some embodiments, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some embodiments, the processor 802 is fabricated, in part, utilizing a package-on-package ("PoP") integrated circuit packaging technique. Moreover, the processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some embodiments, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some embodiments, the RAM 814 or a portion thereof, the ROM 816 or a portion thereof, and/or some combination the RAM 814 and the ROM 816 is integrated in the processor 802. In some embodiments, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some embodiments, the removable storage 820 is provided in lieu of the integrated storage 818. In other embodiments, the removable storage 820 is provided as additional optional storage. In some embodiments, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which may be a WWAN, a WLAN, or a WPAN. Although a single network 828 is illustrated, the network connectivity components 806 may facilitate simultaneous communication with multiple networks. For example, the network connectivity components 806 may facilitate simultaneous communications with multiple networks via one or more of a WWAN, a WLAN, or a WPAN.

In some embodiments, the network 828 can correspond to the network 104 and/or the network 704 illustrated and described in FIGS. 1 and 6-7. In some other embodiments, the network 828 can include the network 104 illustrated and described with reference to FIGS. 1 and 6 and/or the network 704 illustrated and described in FIG. 7. In yet other embodiments, the network 828 can provide access to the network 104 illustrated and described with reference to FIGS. 1 and 6 and/or the network 704 illustrated and described in FIG. 7.

The network 828 may be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 828 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 may be configured to provide voice and/or data communications with any combination of the above technologies. The network 828 may be configured to or adapted to provide voice and/or data communications in accordance with future generation technologies.

In some embodiments, the WWAN component 822 is configured to provide dual- multi-mode connectivity to the network 828. For example, the WWAN component 822 may be configured to provide connectivity to the network 828, wherein the network 828 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 828 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 824 is configured to connect to the network 828 via the WI-FI access points. Such connections may be secured via various encryption technologies including, but not limited, WI-FI Protected Access ("WPA"), WPA2, Wired Equivalent Privacy ("WEP"), and the like.

The network 828 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, also may be incorporated in the computing device architecture 800.

The magnetometer 830 is configured to measure the strength and direction of a magnetic field. In some embodiments the magnetometer 830 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 830 are contemplated.

The ambient light sensor 832 is configured to measure ambient light. In some embodiments, the ambient light sensor 832 provides measurements to an application program stored within one the memory components 804 in order to automatically adjust the brightness of a display (described below) to compensate for low-light and high-light environments. Other uses of measurements obtained by the ambient light sensor 832 are contemplated.

The proximity sensor 834 is configured to detect the presence of an object or thing in proximity to the computing device without direct contact. In some embodiments, the proximity sensor 834 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some embodiments, output from the accelerometer 836 is used by an application program as an input mechanism to control some functionality of the application program. For example, the application program may be a video game in which a character, a portion thereof, or an object is moved or otherwise manipulated in response to input received via the accelerometer 836. In some embodiments, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some embodiments, output from the gyroscope 838 is used by an application program as an input mechanism to control some functionality of the application program. For example, the gyroscope 838 can be used for accurate recognition of movement within a three-dimensional environment of a video game application or some other application. In some embodiments, an application program utilizes output from the gyroscope 838 and the accelerometer 836 to enhance control of some functionality of the application program. Other uses of the gyroscope 838 are contemplated.

The GPS sensor 840 is configured to receive signals from GPS satellites for use in calculating a location. The location calculated by the GPS sensor 840 may be used by any application program that requires or benefits from location information. For example, the location calculated by the GPS sensor 840 may be used with a navigation application program to provide directions from the location to a destination or directions from the destination to the location. Moreover, the GPS sensor 840 may be used to provide location information to an external location-based service, such as E911 service. The GPS sensor 840 may obtain location information generated via WI-FI, WIMAX, and/or cellular triangulation techniques utilizing one or more of the network connectivity components 806 to aid the GPS sensor 840 in obtaining a location fix. The GPS sensor 840 may also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some embodiments, the display 842 and the touchscreen 844 are combined. In some embodiments two or more of the data I/O component 846, the audio I/O component 848, and the video I/O component 850 are combined. The I/O components 810 may include discrete processors configured to support the various interface described below, or may include processing functionality built-in to the processor 802.

The display 842 is an output device configured to present information in a visual form. In particular, the display 842 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 842 is a liquid crystal display ("LCD") utilizing any active or passive matrix technology and any backlighting technology (if used). In some embodiments, the display 842 is an organic light emitting diode ("OLED") display. Other display types are contemplated.

The touchscreen 844 is an input device configured to detect the presence and location of a touch. The touchscreen 844 may be a resistive touchscreen, a capacitive touchscreen, a perceptive pixel touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 844 is incorporated on top of the display 842 as a transparent layer to enable a user to use one or more touches to interact with objects or other information presented on the display 842. In other embodiments, the touchscreen 844 is a touch pad incorporated on a surface of the computing device that does not include the display 842. For example, the computing device may have a touchscreen incorporated on top of the display 842 and a touch pad on a surface opposite the display 842.

In some embodiments, the touchscreen 844 is a single-touch touchscreen. In other embodiments, the touchscreen 844 is a multi-touch touchscreen. In some embodiments, the touchscreen 844 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 844. As such, a developer may create gestures that are specific to a particular application program.

In some embodiments, the touchscreen 844 supports a tap gesture in which a user taps the touchscreen 844 once on an item presented on the display 842. The tap gesture may be used for various reasons including, but not limited to, opening or launching whatever the user taps. In some embodiments, the touchscreen 844 supports a double tap gesture in which a user taps the touchscreen 844 twice on an item presented on the display 842. The double tap gesture may be used for various reasons including, but not limited to, zooming in or zooming out in stages. In some embodiments, the touchscreen 844 supports a tap and hold gesture in which a user taps the touchscreen 844 and maintains contact for at least a predefined time. The tap and hold gesture may be used for various reasons including, but not limited to, opening a context-specific menu.

In some embodiments, the touchscreen 844 supports a pan gesture in which a user places a finger on the touchscreen 844 and maintains contact with the touchscreen 844 while moving the finger on the touchscreen 844. The pan gesture may be used for various reasons including, but not limited to, moving through screens, images, or menus at a controlled rate. Multiple finger pan gestures are also contemplated. In some embodiments, the touchscreen 844 supports a flick gesture in which a user swipes a finger in the direction the user wants the screen to move. The flick gesture may be used for various reasons including, but not limited to, scrolling horizontally or vertically through menus or pages. In some embodiments, the touchscreen 844 supports a pinch and stretch gesture in which a user makes a pinching motion with two fingers (e.g., thumb and forefinger) on the touchscreen 844 or moves the two fingers apart. The pinch and stretch gesture may be used for various reasons including, but not limited to, zooming gradually in or out of a website, visualization, data set, data representation, map, picture, combinations thereof, or the like. Additionally, or alternatively, a double finger touch gesture can be used to place a camera or viewpoint in a scene and/or orbit a target, or the like.

Although the above gestures have been described with reference to the use one or more fingers for performing the gestures, other appendages such as toes or objects such as styluses may be used to interact with the touchscreen 844. As such, the above gestures should be understood as being illustrative and should not be construed as being limiting in any way.

The data I/O interface component 846 is configured to facilitate input of data to the computing device and output of data from the computing device. In some embodiments, the data I/O interface component 846 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 848 is configured to provide audio input and/or output capabilities to the computing device. In some embodiments, the audio I/O interface component 846 includes a microphone configured to collect audio signals. In some embodiments, the audio I/O interface component 846 includes a headphone jack configured to provide connectivity for headphones or other external speakers. In some embodiments, the audio interface component 848 includes a speaker for the output of audio signals. In some embodiments, the audio I/O interface component 846 includes an optical audio cable out.

The video I/O interface component 850 is configured to provide video input and/or output capabilities to the computing device. In some embodiments, the video I/O interface component 850 includes a video connector configured to receive video as input from another device (e.g., a video media player such as a DVD or BLU-RAY player) or send video as output to another device (e.g., a monitor, a television, or some other external display). In some embodiments, the video I/O interface component 850 includes a High-Definition Multimedia Interface ("HDMI"), mini-HDMI, micro-HDMI, DisplayPort, or proprietary connector to input/output video content. In some embodiments, the video I/O interface component 850 or portions thereof is combined with the audio I/O interface component 848 or portions thereof.

The camera 852 can be configured to capture still images and/or video. The camera 852 may utilize a charge coupled device ("CCD") or a complementary metal oxide semiconductor ("CMOS") image sensor to capture images. In some embodiments, the camera 852 includes a flash to aid in taking pictures in low-light environments. Settings for the camera 852 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 854, which can be connected to a battery gauge 856. The batteries 854 may be rechargeable or disposable. Rechargeable battery types include, but are not limited to, lithium polymer, lithium ion, nickel cadmium, and nickel metal hydride. Each of the batteries 854 may be made of one or more cells.

The battery gauge 856 can be configured to measure battery parameters such as current, voltage, and temperature. In some embodiments, the battery gauge 856 is configured to measure the effect of a battery's discharge rate, temperature, age and other factors to predict remaining life within a certain percentage of error. In some embodiments, the battery gauge 856 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via a power I/O component 844.

Based on the foregoing, it should be appreciated that technologies for generating scenes and tours in a spreadsheet application have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for creating a visualization of data, the computer-implemented method comprising performing computer-implemented operations for:
   detecting, at a computer system executing a visualization component, selection of an option to create a tour;
   in response to detecting the selection of the option, creating, at the computer system, the tour;
   detecting, at the computer system, selection of a further option to add a scene to the tour, the scene comprising a view of data having data values, temporal information, an effect, and location information, the data comprising spreadsheet data obtained from a data source in communication with the computer system;
   in response to detecting the selection of the further option, adding the scene to the tour; and
   saving, by the computer system, the tour as an updated version of the spreadsheet data.

2. The method of claim 1, further comprising generating a user interface comprising a tour explorer window, the tour explorer window comprising:
   a thumbnail corresponding to the scene;
   a caption that is editable to modify a name of the tour; and
   a thumbnail caption that is editable to modify a name of the scene.

3. The method of claim 2, wherein the user interface further comprises the option to create the tour, the option to add the scene to the tour, and a play control for playing the tour.

4. The method of claim 3, further comprising:
   in response to detecting selection of the play control, beginning playing of the tour;
   presenting playback controls during playing of the tour, the playback controls comprising a back control;
   detecting selection of the back control to initiate an edit mode; and
   in response to determining that changes are made to the tour during the edit mode, saving an updated version of the tour.

5. The method of claim 1, wherein the effect comprises one or more of a still effect, an orbit effect, a fly-by effect, a figure 8 idle effect, a fly-over effect, and a push-in effect.

6. The method of claim 1, further comprising:
   determining if a further scene is to be added to the tour;
   in response to determining that the further scene is to be added, adding the further scene to the tour; and
   adding a transition between the scene and the further scene.

7. The method of claim 6, further comprising generating a user interface comprising a tour explorer window, the tour explorer window comprising:
   a thumbnail corresponding to the scene;
   a further thumbnail corresponding to the further scene;
   a caption that is editable to modify a name of the tour; and
   thumbnail captions that are editable to modify a name of at least one of the scene or the further scene.

8. The method of claim 7, further comprising detecting, at the user interface, input for reordering scenes of the tour, the scenes comprising the scene and the further scene.

9. The method of claim 6, wherein the transition comprises a cut transition and an arc transition.

10. The method of claim 1, wherein saving the tour comprises exporting a video file corresponding to the tour.

11. An apparatus comprising:
    a processor; and
    a computer storage medium having computer readable instructions stored thereon that, when executed by the processor, cause the apparatus to
       detect selection of an option to create an auto tour,
       in response to detecting the selection of the option, create the auto tour by adding a scene to the tour, the scene comprising a view of data having data values, temporal information, an effect, and location information, the data comprising spreadsheet data obtained from a data source in communication with the apparatus, and
       save the tour as an updated version of the spreadsheet data.

12. The apparatus of claim 11, further comprising computer readable instructions that, when executed by the processor, cause the apparatus to detect a selection of a start time and an end time of the auto tour.

13. The apparatus of claim 11, further comprising computer readable instructions that, when executed by the processor, cause the apparatus to analyze the data to determine a start location.

14. The apparatus of claim 13, further comprising computer readable instructions that, when executed by the processor, cause the apparatus to adjust the effect based on the analysis of the data.

15. The apparatus of claim 11, further comprising computer readable instructions that, when executed by the processor, cause the apparatus to:
- determine if a further scene is to be added to the tour;
- in response to determining that the further scene is to be added, add the further scene to the tour;
- add a transition between the scene and the further scene; and
- save an updated version of the tour.

16. A computer storage medium having computer readable instructions stored thereon that, when executed by a computer, cause the computer to:
- detect selection of an option to create a tour;
- in response to detecting the selection of the option, create the tour; generate a user interface comprising a further option to add a first scene and a second scene to the tour, the first scene and the second scene comprising a view of spreadsheet data having data values, temporal information, and location information;
- present the user interface;
- detect a selection of the further option;
- in response to detecting the selection of the further option, add the first scene and the second scene to the tour, generate a tour explorer window comprising a thumbnail corresponding to the first scene and the second scene, add an effect to the first scene and the second scene, add a transition between the first scene and the second scene, and present the tour explorer window; and
- save the tour.

17. The computer storage medium of claim 16, further comprising computer readable instructions that, when executed by the computer, cause the computer to determine a tour time that specifies the duration of the tour.

18. The computer storage medium of claim 17, further comprising computer readable instructions that, when executed by the computer, cause the computer to adjust a data time based on the determination of the tour time.

19. The computer storage medium of claim 16, wherein the effect comprises one or more of a still effect, an orbit effect, a fly-by effect, a figure eight idle effect, a fly-over effect, or a push-in effect.

20. The computer storage medium of claim 16, wherein the transition comprises a cut transition or an arc transition.

* * * * *